(12) United States Patent
Ohnishi et al.

(10) Patent No.: US 7,697,393 B2
(45) Date of Patent: *Apr. 13, 2010

(54) OPTICAL PICKUP AND OPTICAL INFORMATION RECORDING APPARATUS USING THE SAME

(75) Inventors: Kunikazu Ohnishi, Yokosuka (JP); Tomoto Kawamura, Yokohama (JP); Masayuki Inoue, Yokohama (JP)

(73) Assignees: Hitachi, Ltd., Tokyo (JP); Hitachi Media Electronics Co., Ltd., Iwate-ken (JP)

( * ) Notice: Subject to any disclaimer, the term of this patent is extended or adjusted under 35 U.S.C. 154(b) by 130 days.

This patent is subject to a terminal disclaimer.

(21) Appl. No.: 11/905,509

(22) Filed: Oct. 2, 2007

(65) Prior Publication Data

US 2008/0031119 A1     Feb. 7, 2008

Related U.S. Application Data

(63) Continuation of application No. 10/687,910, filed on Oct. 20, 2003, now Pat. No. 7,327,661.

(30) Foreign Application Priority Data

Oct. 22, 2002     (JP) ............................. 2002-306471

(51) Int. Cl.
     *G11B 7/00* (2006.01)
(52) U.S. Cl. ............................ 369/112.03; 369/112.12; 369/112.11; 369/112.07
(58) Field of Classification Search ............... None
     See application file for complete search history.

(56) References Cited

U.S. PATENT DOCUMENTS

| | | | |
|---|---|---|---|
| 4,775,968 A | 10/1988 | Ohsato | |
| 5,835,471 A | 11/1998 | Miyamoto et al. | |
| 5,994,692 A | 11/1999 | Holzapfel | |
| 6,282,164 B1 | 8/2001 | Katayama | |
| 6,594,210 B2 | 7/2003 | Kumagai | |

(Continued)

FOREIGN PATENT DOCUMENTS

JP     11-134677     5/1999

(Continued)

OTHER PUBLICATIONS

Japanese Office Action, issued in Japanese Patent Application No. JP 2006-084459 dated on Nov. 18, 2008.

(Continued)

*Primary Examiner*—Joseph H Feild
*Assistant Examiner*—Tawfik Goma
(74) *Attorney, Agent, or Firm*—McDermott Will & Emery LLP

(57) ABSTRACT

An optical pickup includes a diffraction grating partitioned into three areas, in which the phase of periodic grating groove structure in an area is successively shifted from that in the adjacent area by 90°. In the generation of a differential push-pull signal, an amplification factor K for sub push-pull signals is varied depending on the type of the optical disk. By such composition of the optical pickup, amplitude deterioration of the tracking error signal accompanying displacement of the object lens is reduced.

9 Claims, 21 Drawing Sheets

U.S. PATENT DOCUMENTS

2002/0150008 A1    10/2002  Shimano et al.
2003/0012092 A1*   1/2003   Katayama ................ 369/44.23
2003/0031103 A1    2/2003   Kuribayashi et al.

FOREIGN PATENT DOCUMENTS

| JP | 2001-236666 | 8/2001 |
| JP | 2004-095077 | 3/2004 |

OTHER PUBLICATIONS

Japanese Office Action, issued in Japanese Patent Application No. JP 2006-136006 dated on Nov. 18, 2008.

United States Office Action issued in U.S. Appl. No. 11/905,533, mailed Oct. 2, 2009.

United States Office Action issued in U.S. Appl. No. 11/905,526, mailed Nov. 25, 2009.

United States Notice of Allowance issued in U.S. Appl. No. 11/905,527, mailed Dec. 1, 2009.

* cited by examiner

OPTICAL PICKUP AND OPTICAL INFORMATION RECORDING APPARATUS USING THE SAME

RELATED APPLICATIONS

This application is a Continuation of U.S. application Ser. No. 10/687,910, filed Oct. 20, 2003 and issued on Feb. 5, 2008 as U.S. Pat. No. 7,327,661, claiming priority of Japanese Application No. 2002-306471, filed Oct. 22, 2002, the entire contents of each of which are hereby incorporated by reference.

BACKGROUND OF THE INVENTION

1. Field of the Invention

The present invention relates to an optical pickup having the function of recording information signals on an optical information record medium (hereafter, simply referred to as "optical disk") or reproducing information which has been recorded on an optical disk by irradiating a spot beam on a recording surface of the optical disk, and an optical information recording/reproducing apparatus equipped with the optical pickup.

2. Prior Art

Optical pickups are generally configured to detect a focus error signal and a tracking error signal, and control the position of an object lens with use of the error signals so that a converged beam spot (hereafter, also referred to as a "convergence spot") can be placed correctly on a proper recording track of an optical disk. As typical methods for detecting the tracking error signal, a 3-spot method, a push-pull method, a differential push-pull method (hereafter, referred to as a "conventional DPP method" for the simplicity of explanation), etc. are well known.

Especially, the conventional DPP method, having the advantage of precisely detecting the tracking error signal with a relatively simple optical system while realizing the detection of a reliable tracking error signal from which offsets (caused by displacement of the object lens and a tilt of the optical disk) have been removed satisfactorily, are widely employed mainly for optical pickups for recordable/rewritable optical disks in recent years (see JP-A-7-272303, for example).

In the following, the principle adopted by the conventional DPP method for the detection of the tracking error signal will be explained briefly with reference to FIG. 1. Incidentally, FIG. 1 will also be used later for the explanation of the present invention because of illustrating a construction element of the invention. As shown in FIG. 1, an optical pickup employing the conventional DPP method incorporates a diffraction grating 2 which is placed between a semiconductor laser light source 1 and a half mirror 3. The diffraction grating 2, which is generally provided with a plurality of linear grating grooves at even pitch as shown in FIG. 2, has the function of diffracting and separating a laser beam emitted from the semiconductor laser light source 1 into at least three beams containing a 0th order beam and ±1st order diffracted beams. The three beams traveling to the optical disk 10 via the half mirror 3, a collimator lens 4 and an object lens 5 are converged separately to form three convergence spots 100, 101 and 102 on the signal recording surface of the optical disk 10 as shown on the left side of FIG. 3. At this point, the positions of the three convergence spots 100, 101 and 102 have been adjusted properly so that irradiation positioned interval 6 measured in the radial direction of the optical disk 10, a direction perpendicular to guide grooves 11 which are periodically formed on the recording surface of the optical disk 10, will be approximately ½ of the groove pitch Tp between the guide grooves 11 (hereafter, the guide groove pitch will also be called "track pitch (Tp)") by rotating the diffraction grating 2 around its optical axis, for example. The three beams forming the convergence spots 100, 101 and 102 are reflected by the optical disk 10, and the reflected beams pass through the object lens 5 and the collimator lens 4 again and reach the half mirror 3. Part of light quantity of the beams is transmitted by the half mirror 3, and the transmitted beams are incident on a photodetector 20 through a detection lens 6.

In the photodetector 20, three photoreceptor surfaces 20a, 20b and 20c, each of which is divided into two or four parts, are arranged as shown on the right side of FIG. 3. The disk-reflected beams (beams reflected by the optical disk) are separately incident on corresponding photoreceptor surfaces and form detection beam spots 200, 201 and 202, respectively. A tracking error signal by the push-pull method (hereafter, simply referred to as "push-pull signal") is obtained for each detection beam spot 200, 201, 202 by letting each subtracter 50a, 50b, 50c execute subtraction of photoelectric signals supplied from the photoreceptor surfaces.

Assuming that the detection beam spots 200, 201 and 202 correspond to the main beam spot 100, the sub spot 101 and the sub beam spot 102 on the optical disk 10 respectively and express push-pull signals obtained from the detection beam spots 200, 201 and 202 as Sa, Sb and Sc respectively, the phases of the push-pull signals Sb and Sc will obviously be different from the phase of the push-pull signal Sa by approximately 180° due to the positional relationship among the convergence spots 100, 101 and 102 on the optical disk 10. In other words, the push-pull signals Sa, Sb and Sa, Sc are outputted as antiphase waveforms (push-pull signals Sb and Sc are in phase). Thus, by adding the signals Sb and Sc, and subtracting the sum Sb and Sc from the signal Sa, an amplified tracking error signal can be obtained (not cancellation but amplification by the subtraction).

Meanwhile, the aforementioned displacement of the object lens and the tilt of the optical disk causes a certain offset component in each push-pull signal; however, such offset components in the push-pull signals Sa, Sb and Sc develop obviously in the same polarity regardless of the positions of the convergence spots 100, 101 and 102 on the disk surface. Therefore, by the aforementioned subtracting operation, the offset components contained in the push-pull signals selectively and advantageously cancel out, and consequently, an excellent tracking error signal from which the offset components have been removed perfectly or satisfactorily can be obtained.

As shown on the right side of FIG. 3, the push-pull signals Sb and Sc are added together by an adder 51, amplified properly by an amplifier 52, and subtracted by an subtracter 53 from the push-pull signal Sa regarding the main beam spot 100, by which the offset component contained in the push-pull signal Sa is removed perfectly or significantly and a high-quality tracking error signal with an enhanced amplitude is outputted.

The above is the signal detection principle adopted by the conventional DPP method. Incidentally, the conventional DPP method is a well-known technique which has been disclosed in JP-A-7-272303.

As explained above, the conventional DPP method has the advantage of precisely detecting the tracking error signal by use of a relatively simple detecting optical system while removing the offset component of the tracking error signal caused by the displacement of the object lens and the tilt of the optical disk perfectly or significantly, and is especially effective as a tracking error signal detection method for optical pickups that are adapted to optical disks having the periodically formed guide grooves.

However, the conventional DPP method explained above also involves the following problem in practical use. In the conventional DPP method, the irradiation positioned interval δ of the three convergence spots on the optical disk has to be adjusted to ½ of the track pitch Tp as mentioned before, by which the detection of satisfactory tracking error signals becomes difficult in cases of optical disks having track pitches Tp widely different from 2δ.

The recordable/rewritable optical disks in rapidly increasing demand have various types such as DVD-RAM, DVD-R and DVD-RW, in which DVD-RAM has two types: DVD-RAM1 (track pitch Tp: about 1.48 μm, storage capacity: about 2.6 GB) and DVD-RAM2 (track pitch Tp: about 1.23 μm, storage capacity: about 4.7 GB). Meanwhile, the track pitch is 0.74 μm in DVD-R and DVD-RW, which is exactly ½ of that of DVD-RAM1.

Recently, a versatile optical pickup, capable of reading/writing from/to all the various types of optical disks, is strongly awaited to come into practical use. In the conventional DPP method, however, if the irradiation positioned interval δ of the three convergence spots is adjusted and optimized for the tracking error signal detection from DVD-RAM, the irradiation positioned interval δ then become almost equal to the track pitch of DVD-R and DVD-RW, by which the tracking error signal detection from DVD-R and DVD-RW by the conventional DPP method becomes difficult. In short, if a single optical pickup is employed for various types of optical disks having different track pitches, the detection of satisfactory tracking error signals by the conventional DPP method might become difficult or impossible for some types of disks.

In order to address the above problem, there has recently been proposed a new tracking error signal detection method capable of handling any track pitch and consistently detecting the tracking error signal satisfactorily regardless of the difference in the track pitch while taking advantage of the merits of the conventional DPP method (e.g. JP-A-9-81942).

The tracking error signal detection method disclosed in JP-A-9-81942 employs almost the same detecting optical system as that of the conventional DPP method, except for the diffraction grating 2 for diffracting and separating the laser beam emitted by the laser light source into three beams. FIG. 4 shows a diffraction grating 2 employed in the document, in which the phase of periodic groove structure in a first half area 27 is shifted from that in a second half area 28 by approximately 180°. While description on the specific signal detection principle for this method described in JP-A-9-81942 is omitted here, by putting the diffraction grating 2 having the special periodic groove pattern at the position of the diffraction grating 2 shown in FIG. 1, even if the three convergence spots 100, 101 and 102 on the optical disk 10 are arranged in a single guide groove 11 as shown on the left side of FIG. 5 differently from the arrangement in the conventional DPP method, the push-pull signal Sa obtained from the detection beam spot 200 corresponding to the main beam spot 100 and the push-pull signals Sb and Sc obtained from the detection beam spots 201 and 202 corresponding to the sub spots 101 and 102 respectively, are outputted as antiphase waveforms (Sb and Sc are in phase) as shown on the right side of FIG. 5. Therefore, a tracking error signal totally equivalent to that in the conventional DPP method can be obtained using the same arithmetic circuitry.

The method explained above, the tracking error signal can be obtained by the differential push-pull method, similarly to the conventional DPP method, even if the three convergence spots are arranged in a single guide groove, the method enables consistent detection of an excellent tracking error signal from which the tracking offsets have been removed satisfactorily regardless of the difference in the disk track pitch.

As explained above, the new tracking error signal detection method disclosed in JP-A-9-81942 (hereafter, referred to as "in-line DPP method" for simplifying the explanation and clarifying the object of the present invention) has significant advantages in that it can resolve the problem with the conventional DPP method dependent on track pitch and realize consistent detection of excellent tracking error signals from various types of optical disks of different track pitches by a single optical pickup, while taking advantage of the merits of the conventional DPP method and employing similar arithmetic circuitry.

However, the in-line DPP method still involves a major problem in practical use as described below.

In the in-line DPP method, if the object lens is displaced or shifted in a direction substantially perpendicular to the recording tracks of the optical disk (hereafter, simply referred to as "tracking direction"), the amplitude of obtained tracking error signals drops significantly as the displacement increases. The deterioration of properties of the tracking error signal accompanying the object lens displacement in the tracking direction (hereafter called "object lens displacement-to-tracking error signal ratio characteristic") is by far more remarkable in the in-line DPP method than in the conventional DPP method. Thus, in order to obtain a usable tracking error signal by the conventional in-line DPP method, the object lens displacement has to be limited to an extremely narrow permissible range, by which practical performance of the optical pickup is necessitated to be impaired seriously at present.

The above problem regarding the "object lens displacement-to-tracking error signal ratio characteristic" has not be mentioned in publicly known documents at all and, as a matter of course, no countermeasure has been disclosed.

SUMMARY OF THE INVENTION

It is therefore the object of the present invention to provide a new tracking error signal detection unit capable of resolving the main problem with the in-line DPP method having deterioration of properties of the tracking error signal accompanying the object lens displacement, while maintaining the aforementioned advantages of the in-line DPP method, that is, capable of consistently detecting a practical tracking error signal from which tracking offsets has been satisfactorily removed from various types of optical disks having different track pitches, being less affected by the difference in the disk track pitch and the object lens displacement in the tracking direction. The present invention especially aims to realize a tracking error signal detection unit with improved versatility and reliability, and to provide an optical pickup and an optical information recording/reproducing apparatus employing such a tracking error signal detection unit.

In accordance with an aspect of the present invention, there is provided an optical pickup comprising: a laser light source; a beam separation unit which separates a laser beam emitted by the laser light source into at least three beams; a converging optical system which converges the three beams and thereby forms three separate convergence spots on a recording surface of an optical disk; and a photodetector which is placed to receive each of reflected beams of the three convergence spots from the optical disk with a photoreceptor surface divided into at least two faces. In the optical pickup, the beam separation unit is divided into at least three areas (first through third areas, with the first area placed between the second and third areas) each of which has prescribed periodic structure. The second area is formed to have periodic structure that is shifted from that of the first area by approximately 90° in the phase of the periodic structure, and the third area is formed to have periodic structure that is shifted from that of the second area by approximately 180° in the phase of the periodic structure.

Preferably, the three convergence spots are formed so that the irradiation positioned interval between adjacent convergence spots measured in a direction substantially orthogonal to guide grooves periodically formed on the recording surface of the optical information record medium will be approximately equal to zero or an integral multiple of the interval between the guide grooves.

In accordance with another aspect of the present invention, an optical information recording/reproducing apparatus at least incorporates the aforementioned optical pickup and a tracking error signal detection unit having the function of detecting a tracking error signal according to a differential push-pull method by executing proper operations to signals obtained from the photoreceptor surfaces of the photodetector of the optical pickup.

In accordance with another aspect of the present invention, an optical information recording/reproducing apparatus comprises: an optical pickup incorporating a laser light source, a beam separation unit which separates a laser beam emitted by the laser light source into a main beam and at least two sub beams, a converging optical system which converges the main beam and the sub beams and thereby forms three separate convergence spots on a recording surface of an optical information record medium on which guide grooves have been formed at preset intervals, and a photodetector which is placed to receive each of reflected beams of the three convergence spots from the optical information record medium with a photoreceptor surface divided into at least two faces; a push-pull signal generation circuit which generates push-pull signals regarding the main beam and the sub beams respectively by executing proper operations to photoelectric signals obtained from the photoreceptor surfaces of the optical pickup; a differential push-pull signal generation circuit which generates a differential push-pull signal by adding all or part of the push-pull signals regarding the sub beams together, amplifying the added signal by an amplification factor K, and subtracting the amplified signal from the push-pull signal regarding the main beam; and an amplification factor control unit which changes the amplification factor K depending on the pitch between the guide grooves of the optical information record medium.

BRIEF DESCRIPTION OF THE DRAWINGS

The objects and features of the present invention will become more apparent from the consideration of the following detailed description taken in conjunction with the accompanying drawings.

FIG. 9 is a schematic diagram showing examples of wavefront shapes and intensity distribution of beam spots on the detector surface in the conventional in-line DPP method;

FIG. 11 is a schematic diagram showing examples of wavefront shapes and intensity distribution of beam spots on the detector surface when a certain amount of object lens displacement occurred in the conventional in-line DPP method;

DETAILED DESCRIPTION OF THE EMBODIMENTS

Figure 1:
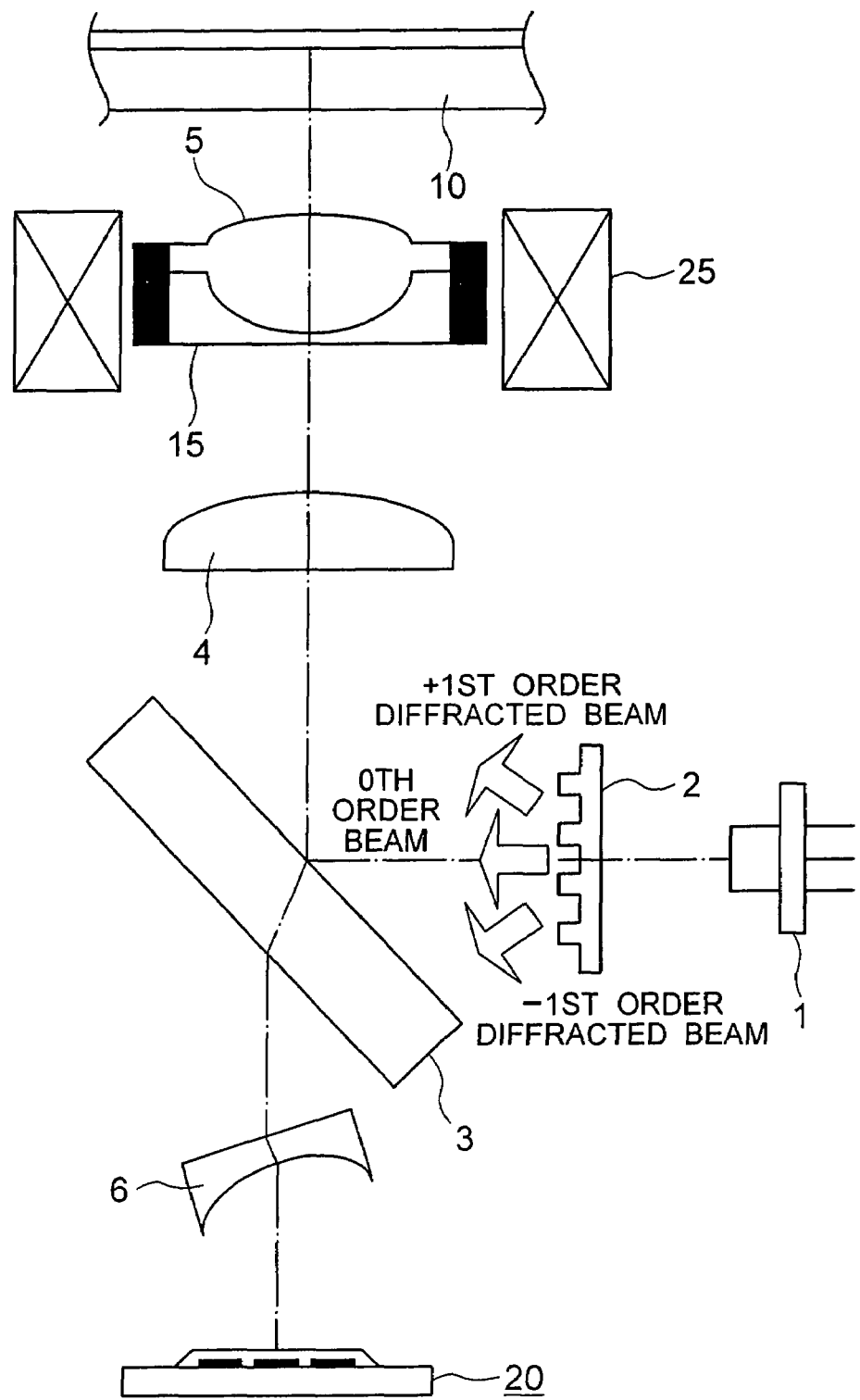
FIG. 1 is a schematic block diagram showing an optical pickup in accordance with an embodiment of the present invention.
Figure 2:
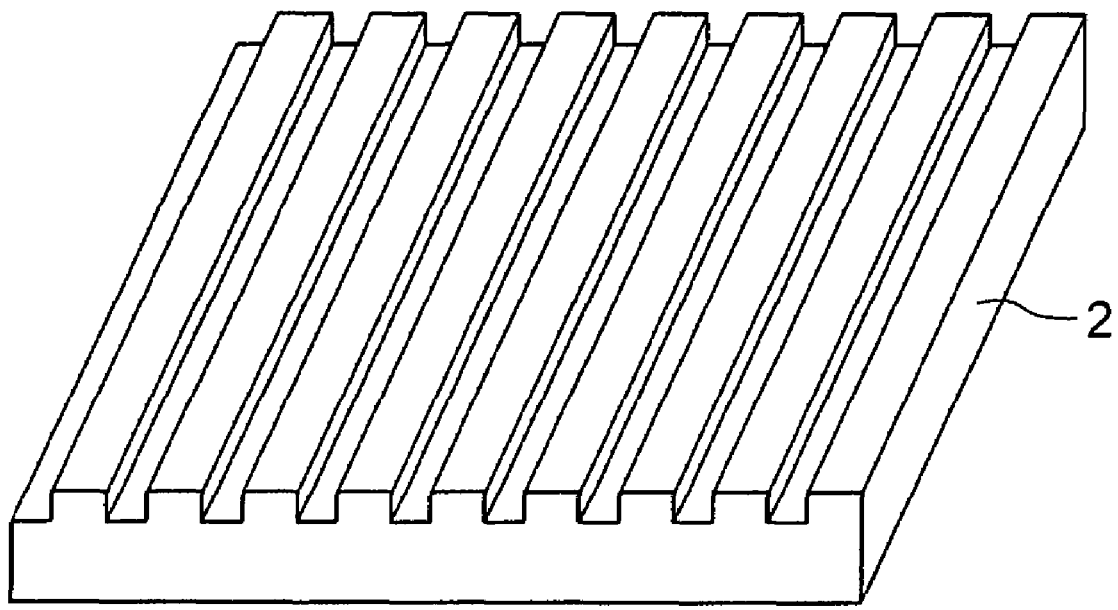
FIG. 2 is a perspective view showing an example of a diffraction grating employed in the conventional DPP method.

Referring now to the drawings, a description will be given in detail of embodiments in accordance with the present invention. While FIG. 1, schematically showing elements of the present invention, has already been used for the description of the prior art, it will be used again for the explanation of the following embodiments. In the following description, elements which have already been explained using reference numerals will be referred to the same reference numerals.

FIG. 1 is a schematic block diagram showing an example of an optical pickup in accordance with the present invention, in which the reference numeral 1 denotes a semiconductor laser light source, 3 denotes a half mirror or beam splitter, 4 denotes a collimator lens, 5 denotes an object lens, 6 denotes a detection lens, 10 denotes an optical disk, and 20 denotes a photodetector having photoreceptor surfaces partitioned according to a prescribed pattern. The object lens 5, being fixed in a lens holder 15, is driven in the direction of the optical axis (focus direction) and in the tracking direction by a two-dimensional actuator 25 composed of electromagnetic circuits.

Figure 6:
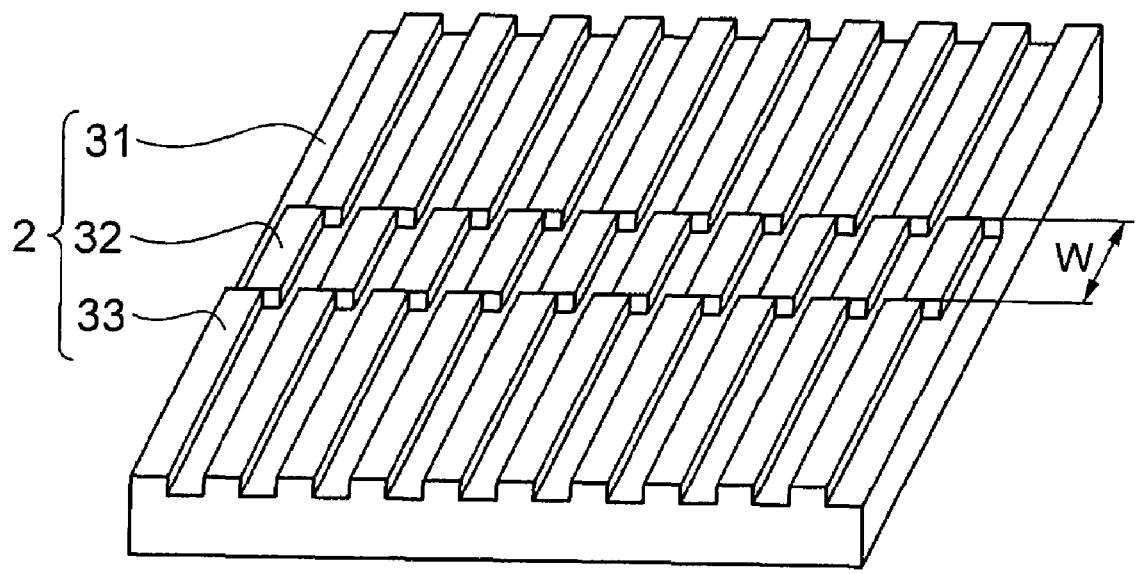
FIG. 6 is a perspective view showing an example of a diffraction grating employed in the present invention.

Between the semiconductor laser 1 and the half mirror 3, a diffraction grating 2 in accordance with the present invention is placed. A diffraction grating 2 (details are shown in FIG. 6) is different from that of FIG. 4 which has been explained in the description of the prior art. The details of the diffraction grating 2 will be explained later. A laser beam emitted by the semiconductor laser 1 is diffracted and separated by the diffraction grating 2 into at least three beams including 0th order beam and ±1st order diffracted beams (unshown). The separated beams are reflected by the half mirror 3, reach the object lens 5 via the collimator lens 4, and are separately converged by the object lens 5 on the recording surface of the optical disk 10 to form three convergence spots 100, 101 and 102.

Figure 7:
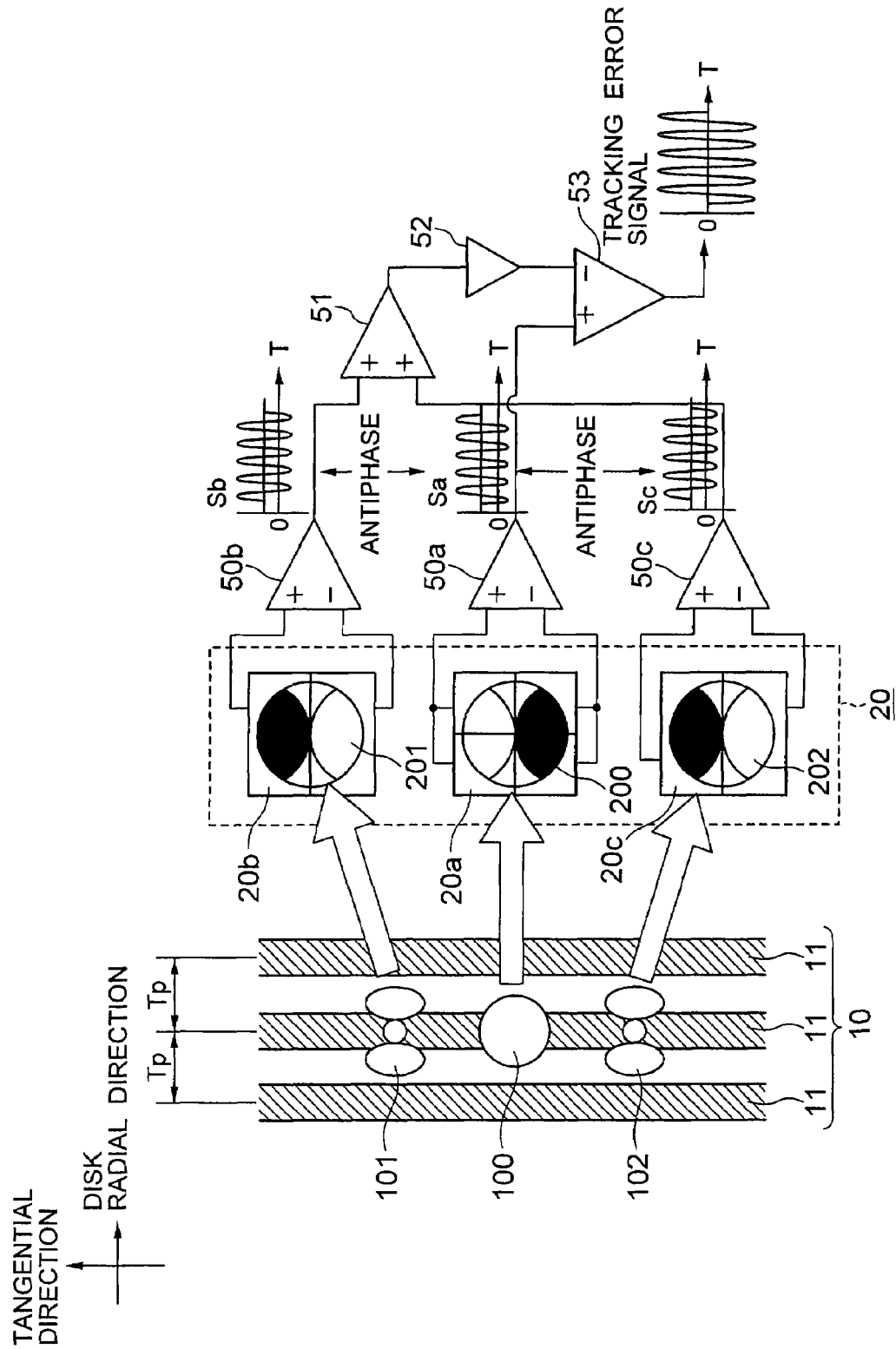
FIG. 7 is a schematic diagram showing an example of the arrangement of convergence spots on the optical disk and the outline composition of the detecting system employed in the present invention.

The three convergence spots 100, 101 and 102 formed on the recording surface of the optical disk 10 at this point are arranged substantially in a line so that they will be in one of the guide grooves 11 periodically formed on the optical disk 10, as shown on the left side of FIG. 7.

The three beams forming the convergence spots 100, 101 and 102 are reflected by the optical disk 10 and travel reversely on almost the same optical path to the half mirror 3 through the object lens 5 and the collimator lens 4. Part of light quantity of the beams is transmitted by the half mirror 3, and the transmitted beams are incident on photoreceptor surfaces of the multi-face photodetector 20 via the detection lens 6. Signals detected by the photoreceptor surfaces of the photodetector 20 are processed by proper arithmetic circuitry and thereby object lens position control signals such as focus error signal, tracking error signal, etc., and information signals which have been stored on the recording surface of the optical disk 10 are obtained. The tracking error signal is obtained from signals detected by photoreceptor surfaces 20a, 20b and 20c of the photodetector 20 by use of exactly the same arithmetic circuitry such as subtracters 50a, 50b and 50c, adder 51, amplifier 52, subtracter 53, etc. as those of the conventional DPP method, as shown on the right side of FIG. 7.

Figure 3:
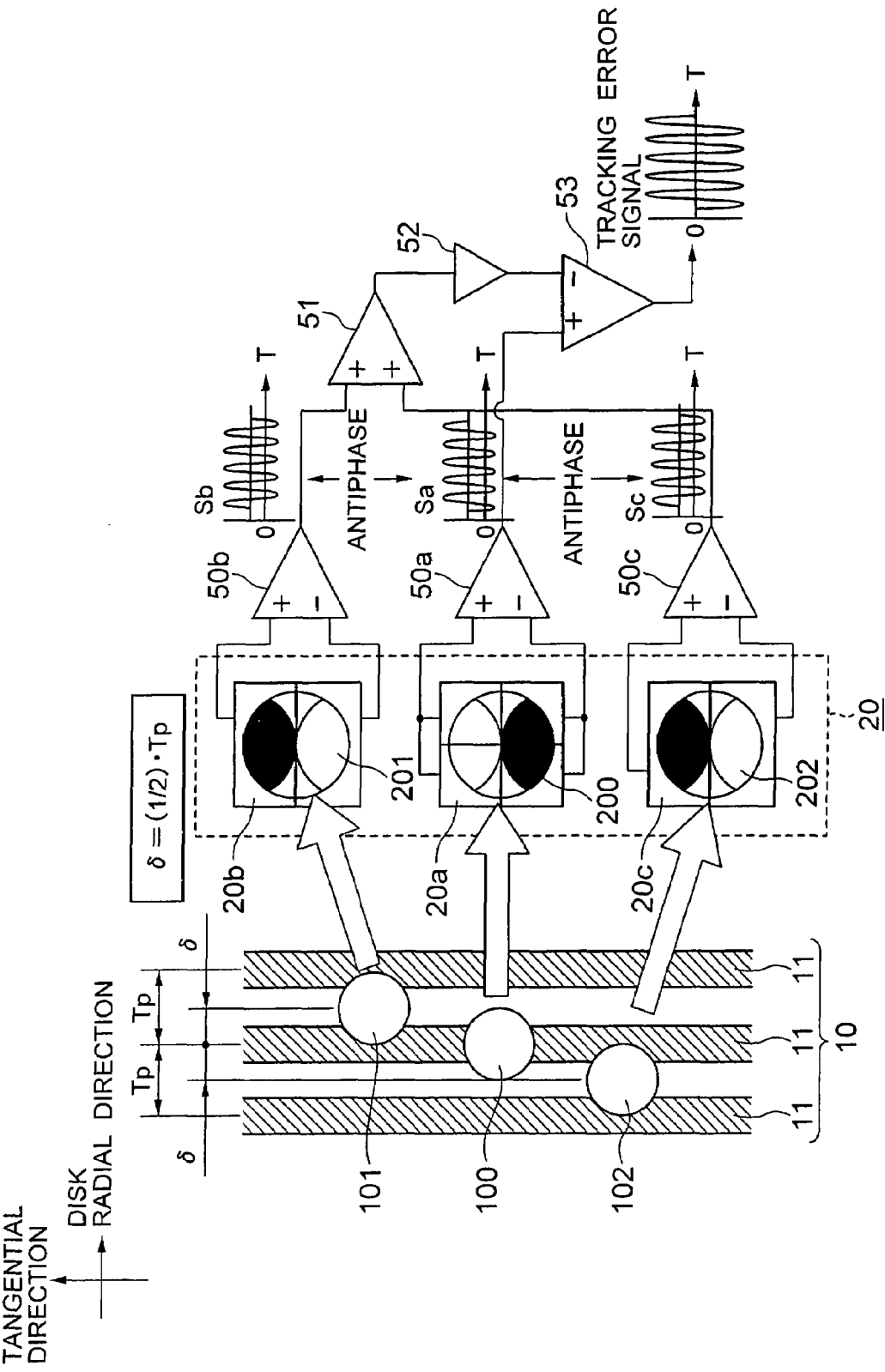
FIG. 3 is a schematic diagram showing the arrangement of convergence spots on the optical disk and the outline composition of the detecting system employed in the conventional DPP method.
Figure 5:
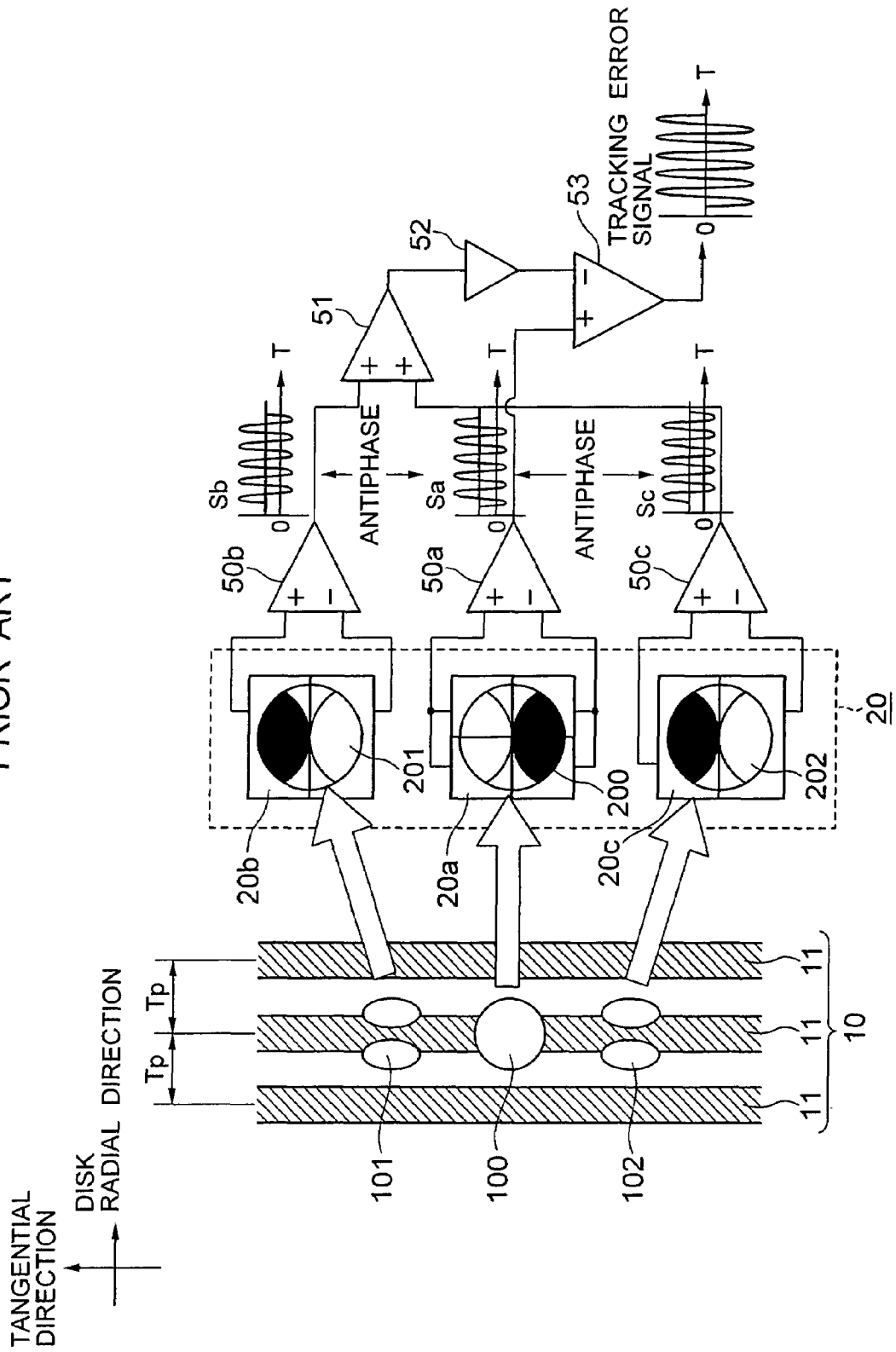
FIG. 5 is a schematic diagram showing the arrangement of convergence spots on the optical disk and the outline composition of the detecting system employed in the conventional in-line DPP method.

In each example shown in FIG. 3, 5 or 7, the photodetector has a plurality of photoreceptor surfaces, each of which is separated into at least two faces in regard to a direction corresponding to the so-called tangential direction of the disk perpendicular to the radial direction of the disk. The push-pull signal regarding each convergence spot is obtained from signals outputted by the two-face photoreceptor surface, by subtracting one from the other. Generally, a push-pull signal is obtained from the difference between two output signals of a two-face photoreceptor surface that is separated into two faces in regard to a direction corresponding to the radial direction of the disk. However, since the examples shown in FIGS. 3, 5 and 7 all employ an astigmatic method for detecting the focus error signal, each beam spot on each photoreceptor surface of the photodetector has intensity distribution that has been rotated around the optical axis by approximately 90°, therefore, the push-pull signal in the examples of FIGS. 3, 5 and 7 is obtained from the difference between two output signals of the two-face photoreceptor surface that is separated into two faces in regard to the direction corresponding to the tangential direction of the disk. Incidentally, the features and advantages of such photoreceptor surface arrangement of the photodetector, in the case where a focus error signal detection unit employing the astigmatic method is combined with a tracking error signal detection unit employing the push-pull method or differential push-pull method as above, have already been publicly known.

While the first embodiment of the present invention shown in FIGS. 1 and 7 has almost the same composition of the optical system and convergence spot arrangement as those in the conventional in-line DPP method which has been explained referring to FIG. 5 etc., the grating pattern of the diffraction grating 2 placed between the semiconductor laser 1 and the half mirror 3 is especially different from that of the in-line DPP method.

FIG. 6 is a perspective view showing a grating pattern of the diffraction grating 2 employed in the present invention. While a plurality of grooves are formed at even intervals as usual on the grating surface of the diffraction grating 2, the grating surface is partitioned into at least three areas by parting lines that are orthogonal to the grooves as shown in FIG. 6. In other words, the grating surface is partitioned into at least three areas 31, 32 and 33 in a direction corresponding to the tracking direction of the optical disk 10. The central area 32 is given a prescribed width W. The phase of the periodically formed grooves of the area 31 adjoining the central area 32 is differentiated from that of the central area 32 by +90°, that is, the groove arrangement in the area 31 is shifted from that in the central area 32 by approximately ¼ of the groove interval. Meanwhile, the phase of the periodically formed grooves of the area 33 adjoining the central area 32 on the opposite side is differentiated from that of the central area 32 by −90°, that is, the groove arrangement in the area 33 is reversely shifted from that in the central area 32 by approximately ¼ of the groove interval. Thus, the groove arrangement in the area 31 is shifted from that in the area 33 by a phase difference of 180° or half a pitch.

Figure 8:
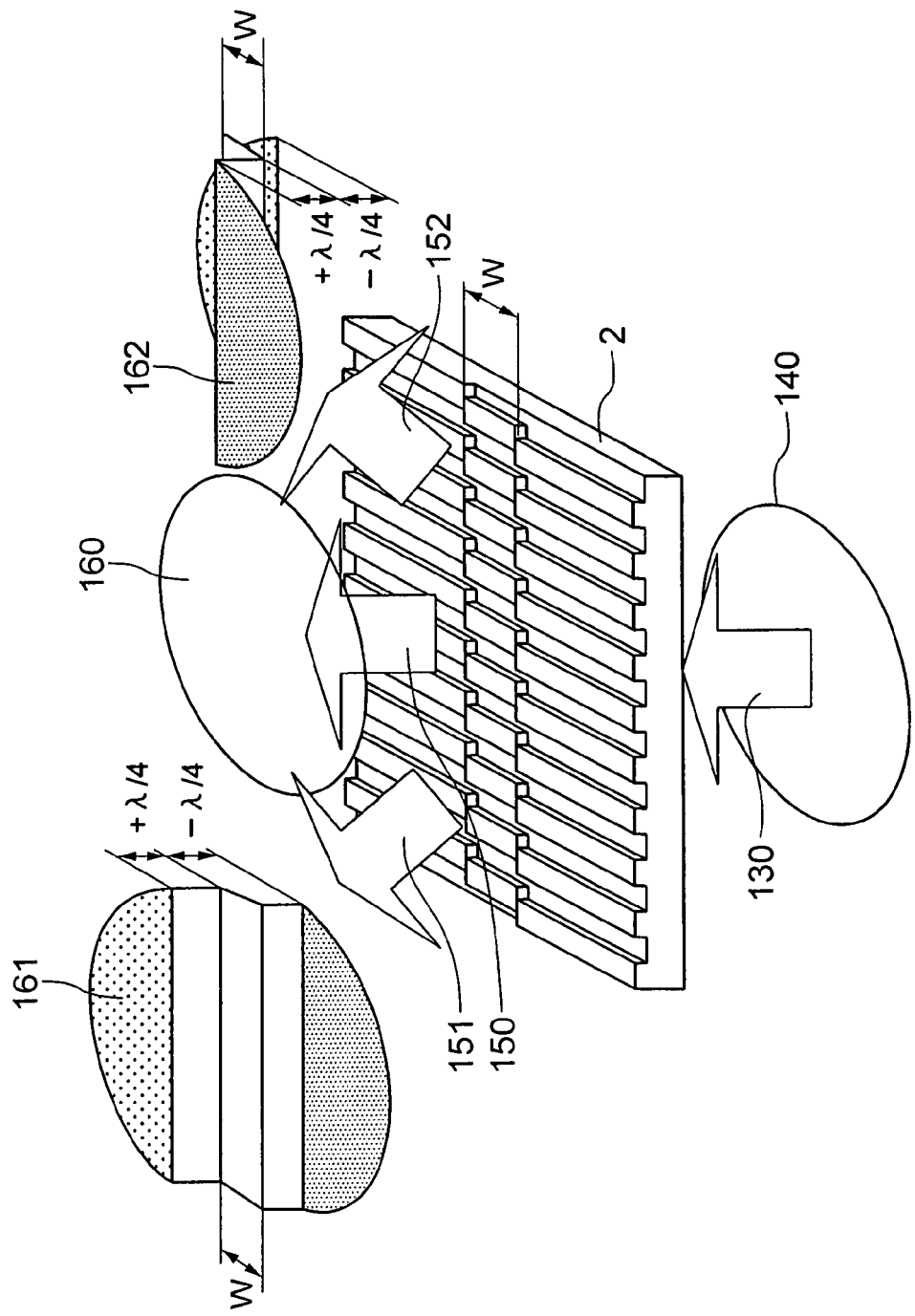
FIG. 8 is a perspective view showing wavefront shapes of a transmitted beam and diffracted beams when the diffraction grating of the present invention is used.

Each 1st order diffracted beam is diffracted and separated by the special grating pattern of the diffraction grating 2 to receive a certain type of modulation to its wavefront (equiphase surface). FIG. 8 is a schematic diagram showing the wavefront modulation given by the diffraction grating 2. For example, when a beam 130 with a plane wavefront 140 is incident on the diffraction grating 2, each of the wavefronts (equiphase surfaces) 161 and 162 of the +1st and −1st order diffracted beams 151 and 152 diffracted and separated by the diffraction grating 2, has a step-like shape having three stages with level differences of $\lambda/4$ (corresponding to phase differences of 90°) as shown in FIG. 8. In this case, the width of the central area of the 3-stage wavefront equals the width W of the central area 32 of the diffraction grating 2. As shown in FIG. 8, the shapes of the wavefronts 161 and 162 have reversed convexity/concavity and phase variation. On the other hand, the grating pattern has no effect on the 0th order beam 150 which passes through the grating intact, and thus the 0th order beam 150 has a plane wavefront (equiphase surface) 160 like the incident beam 130. Incidentally, while the above explanation has been given assuming that the beam 130 incident on the diffraction grating 2 is a parallel beam with a plane wavefront (equiphase surface) for the sake of simplicity, even if a diverging beam emitted by the semiconductor laser light source 1 is directly incident on the diffraction grating 2, that is, even when the beam incident on the diffraction grating 2 has a more or less spherical wavefront as in the embodiment of FIG. 1, the diffraction grating 2 gives the 1st order diffracted beams similar phase modulation and the 3-stage wavefront shapes.

In the following, an explanation will be given on the reason why the "object lens displacement-to-tracking error signal ratio characteristic" is more improved by the above embodiment employing the special diffraction grating partitioned into three areas and using the 1st order diffracted beams having the 3-stage wavefronts (equiphase surfaces) rather than by the conventional in-line DPP method even though the same tracking error signal detection unit is used.

First, the principle adopted by the in-line DPP method for the tracking error signal detection will be explained briefly.

As mentioned before, the conventional in-line DPP method employs the diffraction grating 2 having two areas (see FIG. 4) for diffracting and separating the laser beam emitted by the semiconductor laser light source 1 into three beams. By diffracting and separating the laser beam using such a diffraction grating 2, each ±1st order diffracted beam is given a step-like wavefront having two stages with a level difference of $\lambda/2$ corresponding to a phase difference of 180°, travels through the collimator lens 4 and the object lens 5 maintaining the state, and is converged on the recording surface of the optical disk (Hereafter, the convergence spots of the ±1st order diffracted beams on the optical disk will be simply referred to as "sub beam spots").

Meanwhile, the 0th order beam passes through the diffraction grating 2 intact receiving no phase modulation to its wavefront, is collimated by the collimator lens 4 into a parallel beam having a plane wavefront, enters the object lens 5 as the parallel beam, and is converged on the recording surface of the optical disk similarly to the ±1st order diffracted beams (Hereafter, the convergence spot of the 0th order beam on the optical disk will be simply referred to as "main beam spot").

Incidentally, when a laser beam is converged on the recording surface of the optical disk having the periodic guide grooves, the laser beam being reflected by the disk is diffracted by the guide grooves and is separated into at least three beams: a 0th order beam and ±1st order diffracted beams. The 0th order beam and the ±1st order diffracted beams from the disk travel through the pupil plane of the object lens overlapping with one another and having certain deviations from one another, and reach a photoreceptor surface of the photodetector. An area on the photoreceptor surface where the 0th order beam and a ±1st order diffracted beam overlap with each other, has a certain level of light intensity due to the interference between the beams. In this case, whether the light intensity is high or low (light or dark) is decided by relative phase difference between the wavefronts of the overlapping 0th order beam and ±1st order diffracted beam, and the phase differences among the 0th order beam wavefront and the ±1st order diffracted beam wavefronts change successively depending on the position of the convergence spot relative to the guide grooves of the disk.

Figure 9:
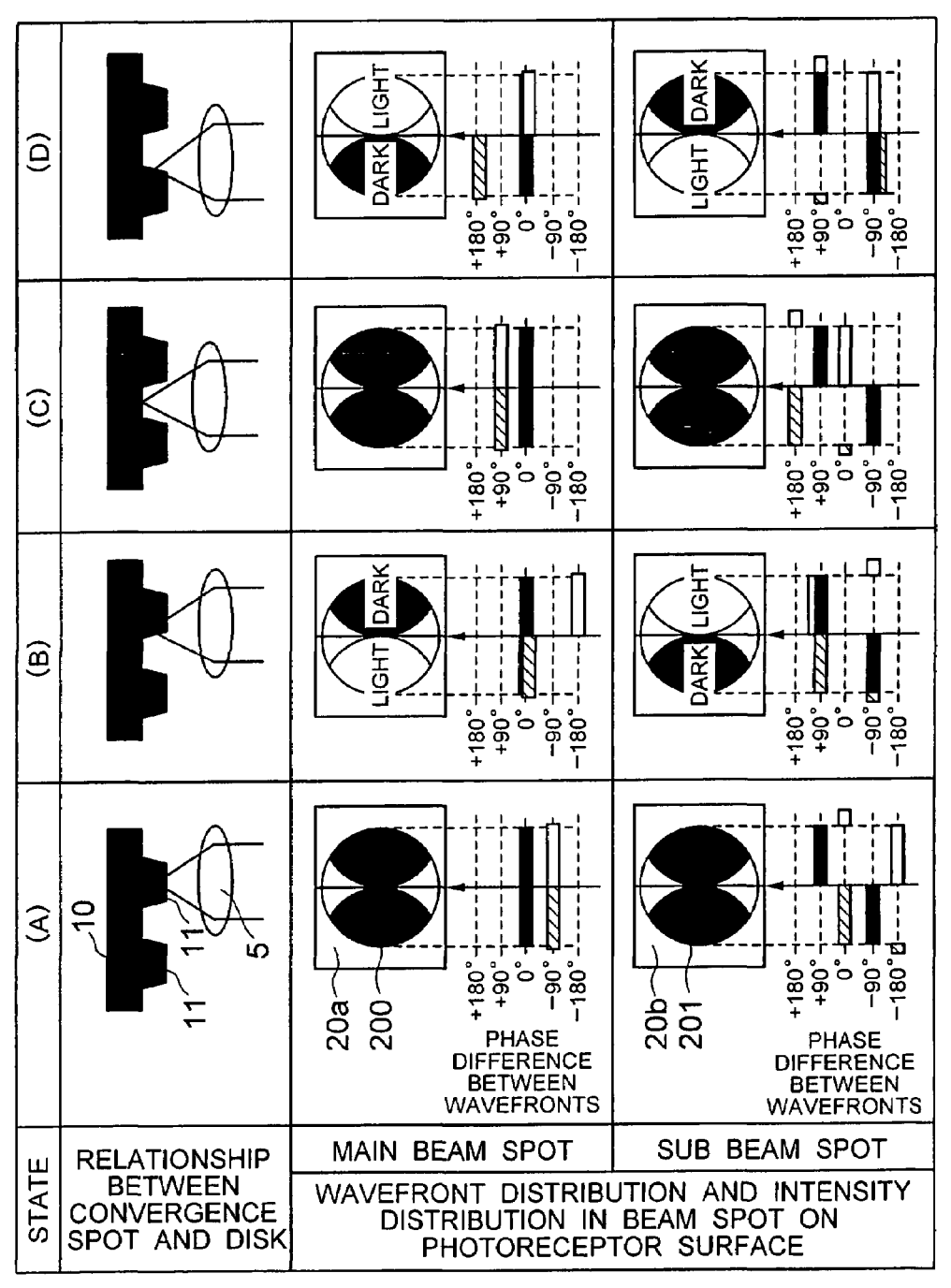

FIG. 9 is a schematic diagram showing the phase relationship among the wavefronts of the 0th order beam and ±1st order diffracted beams, diffracted and separated by the guide grooves of the disk, which are overlapping with one another in the detection beam spot on each photoreceptor surface while having certain deviations from one another when the disk-reflected beams from the main beam spot and the sub beam spots reach the photoreceptor surfaces of the photodetector in the conventional in-line DPP method employing the special diffraction grating having two areas, and statuses of light intensity (light or dark) caused by interference of beams depending on the phase relationship, classifying the cases by the positional relationship between the convergence spot and the guide grooves on the disk.

Regarding the main beam spot shown in FIG. 9, in the detection beam spot 200 on the photoreceptor surface, the ±1st order diffracted beams overlap with the 0th order beam having certain rightward/leftward deviations from the 0th order beam as mentioned above. The wavefronts of the 0th order beam and the ±1st order diffracted beams all have substantially plane shapes. In states (A) and (C) of FIG. 9 where the convergence spot is located at the center of a guide groove 11 or at the midpoint between two guide grooves 11, the wavefronts of the ±1st order diffracted beams caused by the guide grooves have phase differences of +90° or −90° relative to the wavefront of the 0th order beam. As the convergence spot shifts gradually from the position or state, the phase relationship among the wavefronts also change successively. In a state (B) where the convergence spot has shifted by ¼ of the groove pitch and in a state (D) where the convergence spot has reversely shifted by ¼ of the groove pitch, one of the ±1st order diffracted beam wavefronts caused by the guide grooves has a phase difference of 0° relative to the 0th order beam wavefront and the other has a phase difference of 180° relative to the 0th order beam wavefront. Further, the states (B) and (D) have inverse phase difference relationships between right and left (the overlap area of the +1st order diffracted beam and the 0th order beam and the overlap area of the −1st order diffracted beam and the 0th order beam).

Thus, the light intensity in the overlap area of the +1st order diffracted beam and the 0th order beam and that in the overlap area of the −1st order diffracted beam and the 0th order beam vary continuously depending on the positional relationship between the convergence spot and the guide grooves on the disk, and further, the variations occur in the right and left overlap areas perfectly inversely. Therefore, the tracking error signal according to the so-called push-pull method can be obtained by letting the photodetector and the photoreceptor surface partitioned into at least two separately detect the light intensity variations in the right and left overlap areas and output a differential signal.

Regarding the sub beam spots in the conventional in-line DPP method, the wavefront of each beam has a step-like shape having two stages with a level difference of $\lambda/2$ corresponding to a phase difference of 180° as mentioned before, and the step-like wavefront shape remains unchanged even if the beam is reflected by the optical disk till the beam reaches the photoreceptor surface of the photodetector. Similarly to the case of the main beam spot, the ±1st order diffracted beams diffracted and separated by the guide grooves of the disk overlap with the 0th order beam having certain rightward/leftward deviations from the 0th order beam, and the light intensity in the overlapping part changes due to interference depending on the relative phase difference between the 0th order beam wavefront and the +1st order diffracted beam wavefront and that between the 0th order beam wavefront and the −1st order diffracted beam wavefront. It is also totally similar to the case of the main beam spot that average phase difference between the 0th order beam wavefront and each 1st order diffracted beam wavefront caused by the guide grooves exhibits certain variation depending on the positional relationship between the convergence spot and the guide grooves on the disk (states (A) to (D)).

However, in the case of the sub beam spots, since each wavefront has a step-like shape having two stages with a level difference of λ/2 corresponding to a phase difference of 180° as mentioned before, even if the average phase difference between the 0th order beam wavefront and each ±1st order diffracted beam wavefront determined by the positional relationship between the convergence spot and the guide grooves on the disk (states (A) to (D)) exhibited exactly the same behavior as in the case of the main beam spot, resultant changes of the light intensity in the right/left interference areas become totally opposite to those in the case of the main beam spot, as shown in FIG. 9. This means that in the in-line DPP method, the phase of waveform of the push-pull signal obtained from each sub beam spot becomes totally opposite to that of the push-pull signal obtained from the main beam spot even if the sub beam spots and the main beam spot had exactly the same positions relative to the guide grooves on the disk. The above mechanism enables the in-line DPP method, although employing the in-line convergence spot arrangement with the main beam spot and the sub beam spots located in the same guide groove, to obtain the tracking error signals like those in the conventional DPP method.

Figure 10:
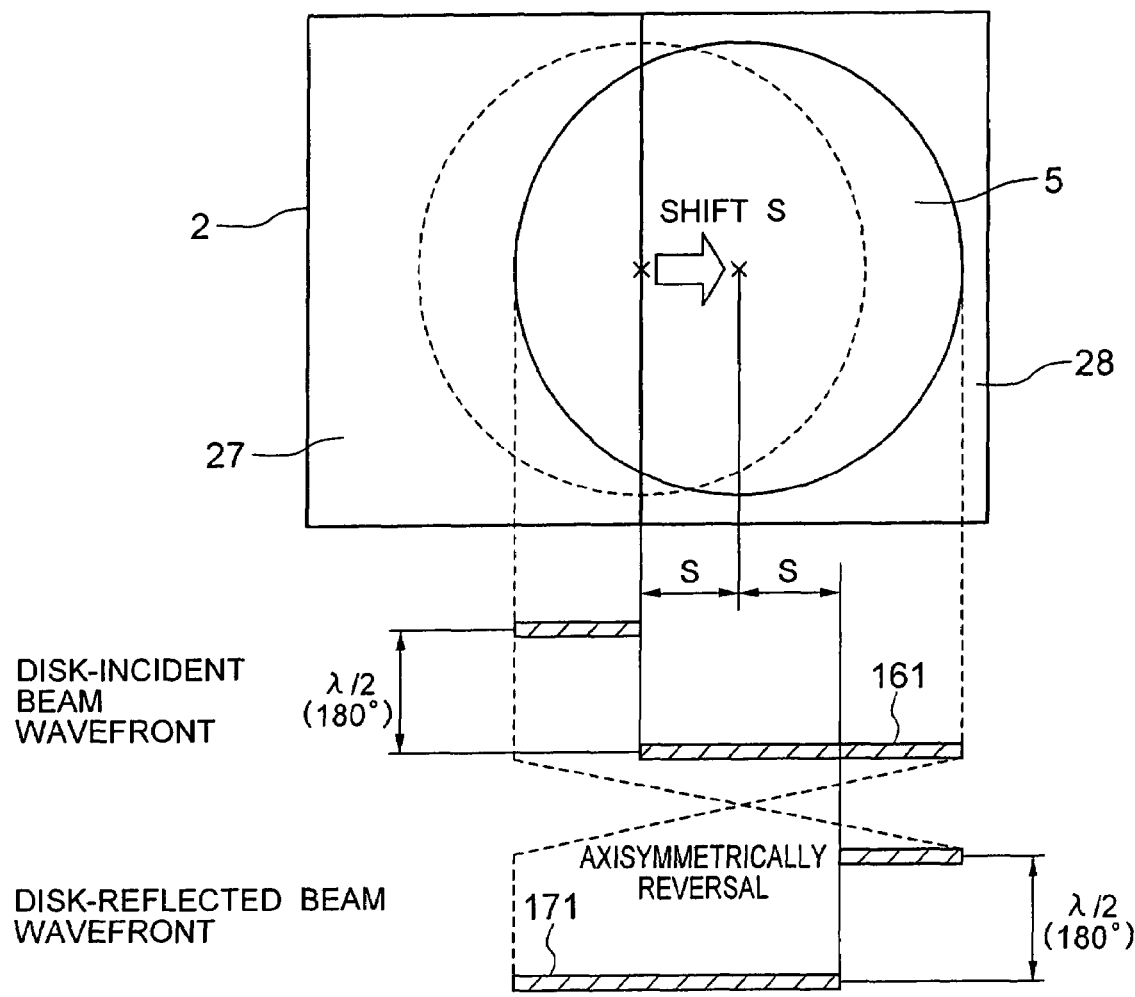
FIG. 10 is a schematic diagram showing sectional forms of wavefronts of ±1st order diffracted beams when displacement of the object lens occurred in the conventional in-line DPP method.

Next, in a case where the object lens is displaced or shifted in the tracking direction on radial direction of the optical disk by a certain shift amount S in the above-described in-line DPP method, there naturally occurs a shift corresponding to the shift amount S between the central optical axis of the object lens 5 and a boundary line between the areas 27 and 28 of the diffraction grating 2, as shown in FIG. 10. As a result, there also occurs a shift between the central optical axis of the object lens 5 and a boundary line, where the level difference exists, on the wavefront 161 of the ±1st order diffracted beam emerging from the diffraction grating 2, causing a difference of width between the two wavefront areas having the λ/2 level difference corresponding to 180° phase difference. Further, when the +1st or −1st order diffracted beam is reflected by the disk, the wavefront 161 of the beam is converted into a wavefront 171 of a disk-reflected beam as shown in FIG. 10. Since the wavefront 171 of the disk-reflected beam has a shape that is obtained by axisymmetrically reversing the wavefront 161 of the disk-incident beam with respect to the central optical axis of the object lens as the symmetry axis, the wavefront 171 of the disk-incident beam entering the photoreceptor surface also has the difference of width between its two areas having the λ/2 level difference corresponding to 180° phase difference, similarly to the wavefront 161 of the disk-incident beam.

Figure 11:
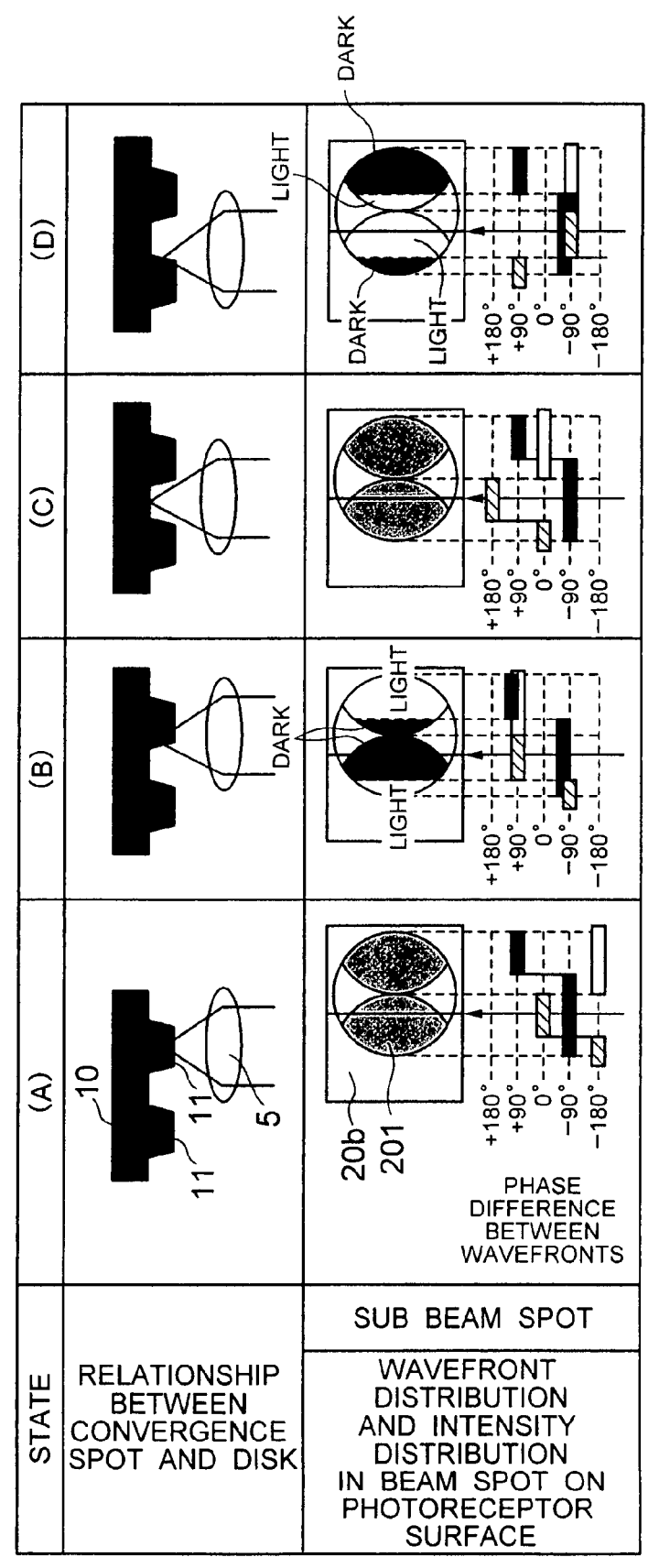

FIG. 11 is a schematic diagram showing the phase relationship among the wavefronts of the 0th order beam and ±1st order diffracted beams, diffracted and separated by the guide grooves of the disk, which are overlapping with one another in the detection beam spot 201 (or 202) on the photoreceptor surface 20b (or 20c) while having certain deviations from one another when a sub beam spot generated by converging a 1st order diffracted beam, whose wavefront has come to have the level difference between its two wavefront areas and asymmetry with respect to the central optical axis of the object lens due to the displacement of the object lens, has formed the detection beam spot 201 (or 202) on the photoreceptor surface 20b (or 20c) of the photodetector after being reflected by the disk, and statuses of light intensity caused by interference of beams depending on the phase relationship, classifying the cases by the positional relationship between the convergence spot and the guide grooves on the disk.

The following points become clear by comparing FIGS. 11 and 9. Referring first to FIG. 9 with no displacement of the object lens, in the states (B) and (D) where the convergence spot has shifted from a guide groove by ¼ of the groove interval, the phase difference between the wavefronts of the 0th order beam and each 1st order diffracted beam after being diffracted and separated by the guide grooves is fixed to 0° or 180° throughout each right/left overlap area, by which the light intensity becomes full-light or full-dark throughout each overlap area.

Meanwhile, referring to FIG. 11 with the width difference between the two wavefront areas having the λ/2 level difference corresponding to 1800 phase difference due to displacement of the object lens, even in the states (B) and (D), the phase difference between the wavefronts of the 0th order beam and each 1st order diffracted beam changes from 0° to 180° or from 180° to 0° even in the right/left overlap areas. As a result, a dark part appears in each light overlap area and a light part appears in each dark overlap area. By the appearance of the intensity-inverted parts in the overlap areas, the push-pull signal obtained from a difference signal between the signals detected by the right and left photoreceptor faces obviously loses its modulation degree. The above is the primary cause of the deterioration of the "object lens displacement-to-tracking error signal ratio characteristic" occurring more significantly in the conventional in-line DPP method employing the diffraction grating having two areas rather than in the conventional DPP method.

Figure 12:
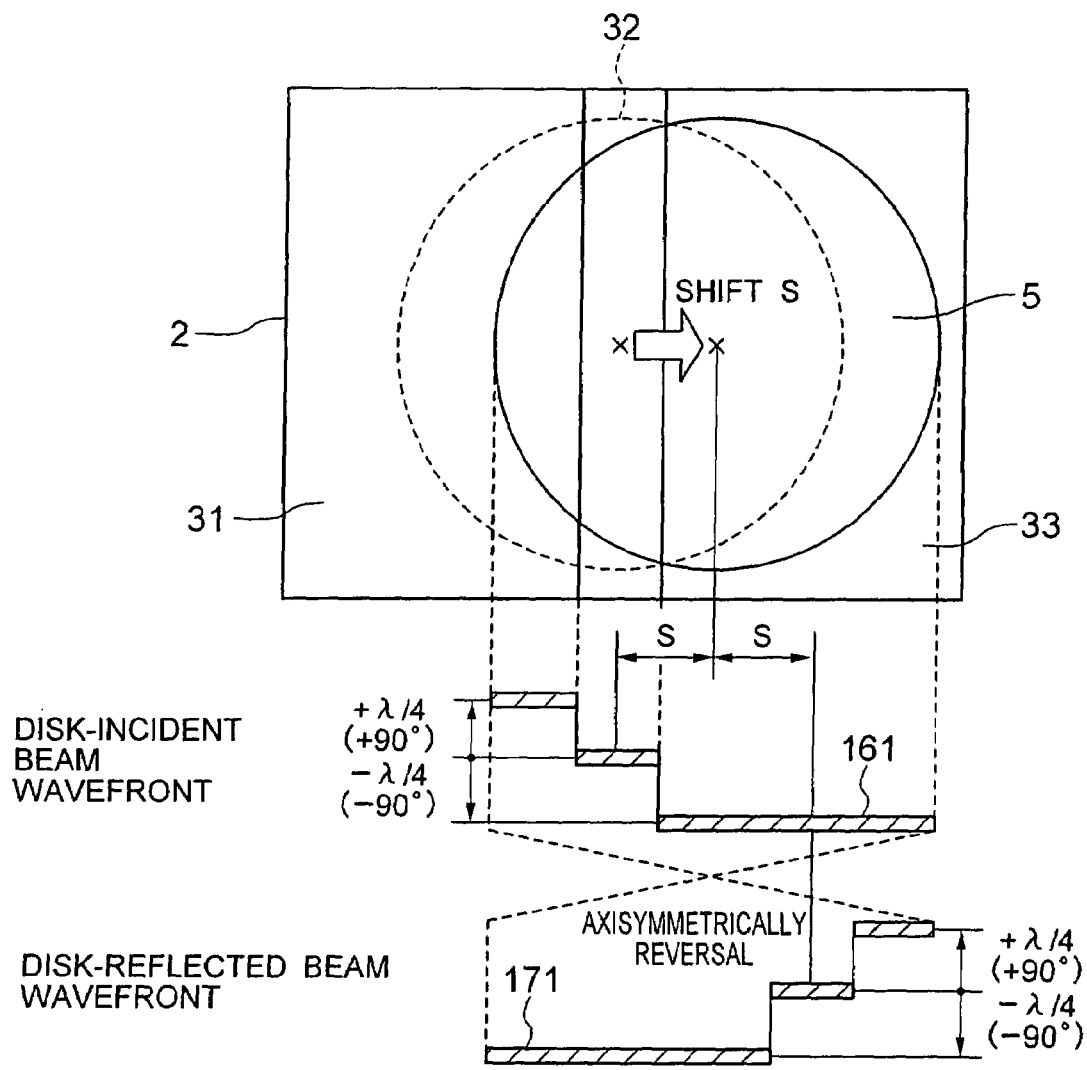
FIG. 12 is a schematic diagram showing sectional forms of wavefronts of ±1st order diffracted beams when displacement of the object lens occurred in the present invention.

In contrast to the conventional in-line DPP method which has been explained above, the present invention employs the aforementioned diffraction grating 2 partitioned into three parts. By use of such a diffraction grating 2, a +1st order diffracted beam from the diffraction grating 2 incident on the optical disk and a +1st order diffracted beam after being reflected by the optical disk both have a step-like wavefront having three stages with level differences of λ/4 corresponding to phase differences of 90° as shown in FIGS. 8 and 12. Incidentally, while the wavefront of each (disk-incident/disk-reflected) −1st order diffracted beam is not shown in FIG. 12, the −1st order diffracted beam wavefront has a shape (convexity/concavity) reverse to the +1st order diffracted beam wavefront as is clear from FIG. 8.

Figure 13:
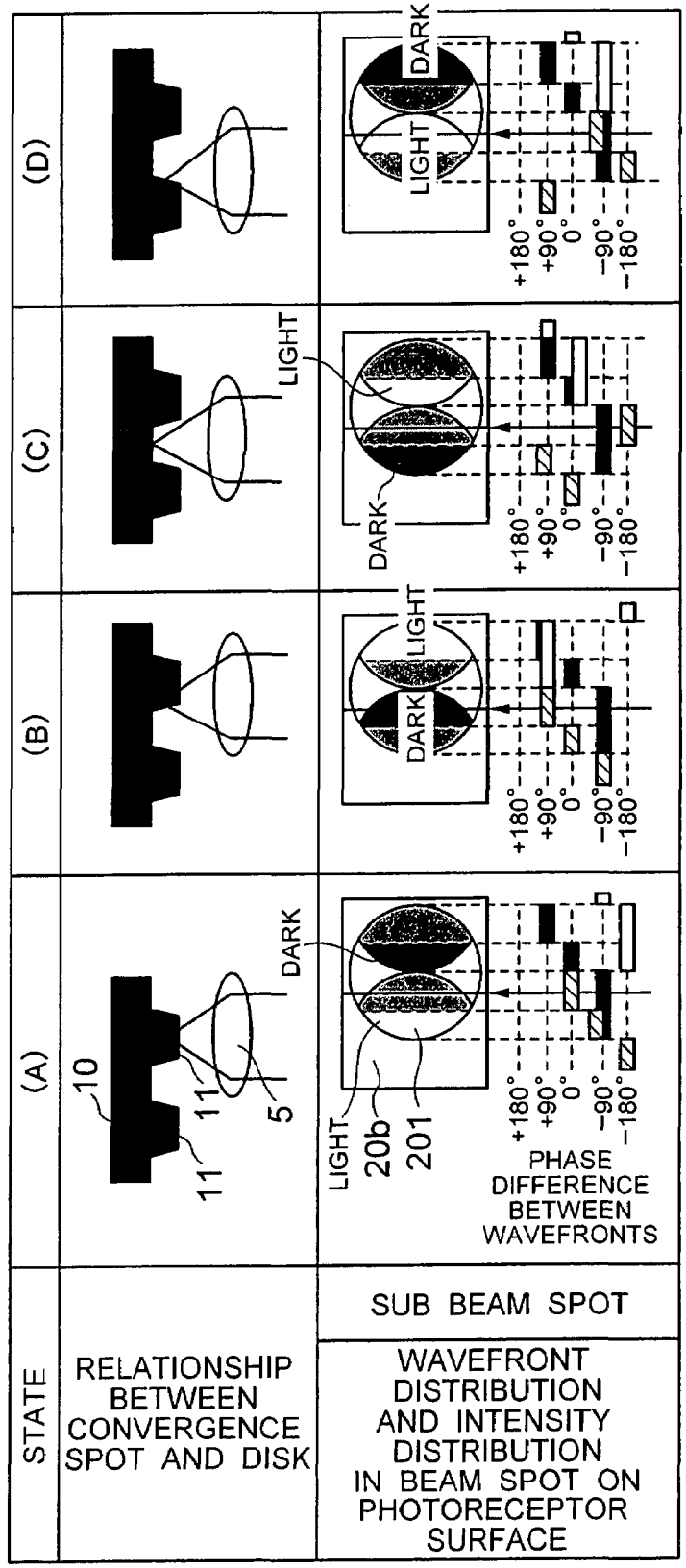
FIG. 13 is a schematic diagram showing examples of wavefront shapes and intensity distribution of beam spots on the detector surface when a certain amount of object lens displacement occurred in the present invention.

FIG. 13 is a schematic diagram showing the phase relationship among the wavefronts of the 0th order beam and ±1st order diffracted beams, diffracted and separated by the guide grooves of the disk, which are overlapping with one another in the detection beam spot 201 on the photoreceptor surface 20b while having certain deviations from one another when the 3-stage wavefront has been formed by use of the 3-area diffraction grating 2 of the present invention and the +1st order diffracted beam, having the wavefront which has become asymmetrical with respect to the central optical axis of the object lens 5 due to the displacement of the object lens 5 in the disk radial direction as shown in FIG. 12, has been converged by the object lens 5 on the recording surface of the optical disk as a sub beam spot and formed the detection beam spot 201 on the photoreceptor surface 20b of the photodetector 20 after being reflected by the optical disk, and statuses of light intensity caused by interference of beams depending on the phase relationship, classifying the cases by the positional relationship between the convergence spot and the guide grooves on the disk.

As is clear from the comparison between FIGS. 13 and 11, the distribution of light intensity in the right/left interference areas in FIG. 13 with the 3-area diffraction grating 2 of the present invention is obviously different from that in FIG. 11 with the conventional 2-area diffraction grating. For example, in the parts which have been called "intensity-inverted parts" in the states (B) and (D) of FIG. 11, the phase difference between the 0th order beam and ±1st order diffracted beam diffracted and separated by the guide grooves becomes ±90° in the present invention and the parts have intermediate light intensity between that of the light area and that of the dark area. While the above explanation was actually only about the +1st order diffracted beam, out of the two 1st order diffracted beams diffracted and separated by the diffraction grating 2 of the present invention, as a matter of course, a similar phenomenon occurs regarding the −1st order diffracted beam. As a result, in each push-pull signal obtained from each sub beam spot by the present invention, the modulation degree deterioration rate relative to the object lens displacement is reduced much compared to the conventional in-line DPP method employing the 2-area diffraction grating, by which the "object lens displacement-to-tracking error signal ratio characteristic" is improved significantly.

Figure 14:
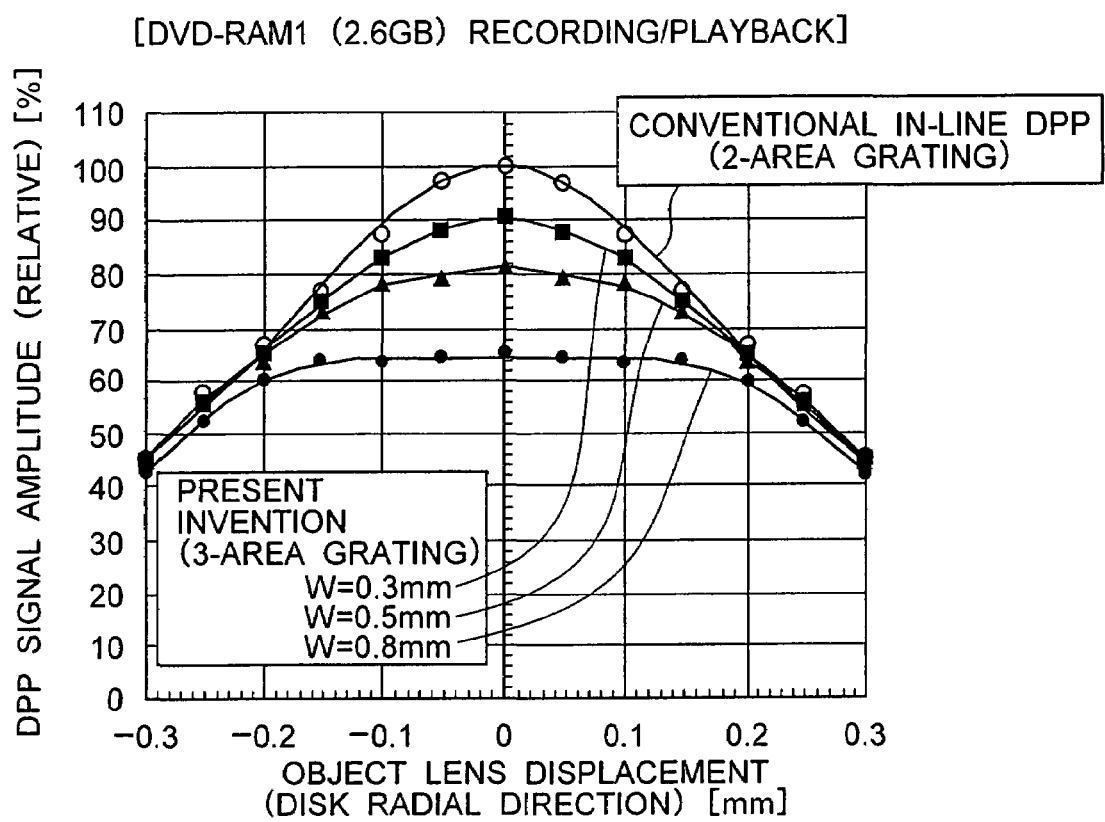
FIG. 14 is a graph showing the "object lens displacement-to-tracking error signal ratio characteristic" when a DVD-RAM1 disk is played back by optical pickups according to the present invention and the conventional in-line DPP method.

FIG. 14 is a graph showing the relationship between the object lens displacement in the tracking direction and the amplitude of the tracking error signal detected by the in-line DPP method (hereafter, the tracking error signal will be simply referred to as "DPP signal"), that is, the "object lens displacement-to-tracking error signal ratio characteristic" of the DPP signal, which has been obtained by computer simulation for a case where a DVD-RAM1 disk (storage capacity: 2.6 GB, guide groove interval: 1.48 μm) is played back by an optical pickup having parameters which will be mentioned below. In FIG. 14, the horizontal axis denotes the displacement of the object lens 5 and the vertical axis denotes relative amplitude of the DPP signal, in which relative amplitude 100% equals the DPP signal amplitude when the conventional in-line DPP method with the 2-area diffraction grating is employed and the object lens displacement is 0. In addition to the result for the conventional in-line DPP method, FIG. 14 also shows the "object lens displacement-to-tracking error signal ratio characteristics" for three cases where the in-line DPP method of the present invention, with the 3-area diffraction grating, is employed. In the three cases, the width W of the central area 32 of the 3-area diffraction grating 2 measured in the direction corresponding to the disk radial direction was changed, in which the width W, converted into the width of the corresponding central area of the wavefront of the beam just before entering the object lens 5, was set to 0.3 mm, 0.5 mm and 0.8 mm.

Key parameters of the optical pickup used for the computer simulation were as below:

(1) laser beam wavelength: 660 nm
(2) power: about 6.3×
(3) object lens NA: about 0.64

As seen in FIG. 14, in the three cases employing the in-line DPP method of the present invention, with the 3-area diffraction grating, the DPP signal amplitude near the 0 displacement line, object lens displacement=0, is lower than in the conventional in-line DPP method with the 2-area diffraction grating; however, the deterioration rate of DPP signal amplitude with respect to the object lens displacement is reduced, which means the "object lens displacement-to-tracking error signal ratio characteristic" is improved by the in-line DPP method of the present invention. Incidentally, the drop in the DPP signal amplitude near the 0 displacement line is insignificant since it can be compensated for by amplifying the outputted DPP signal by an amplifier with a proper amplification factor.

Figure 15:
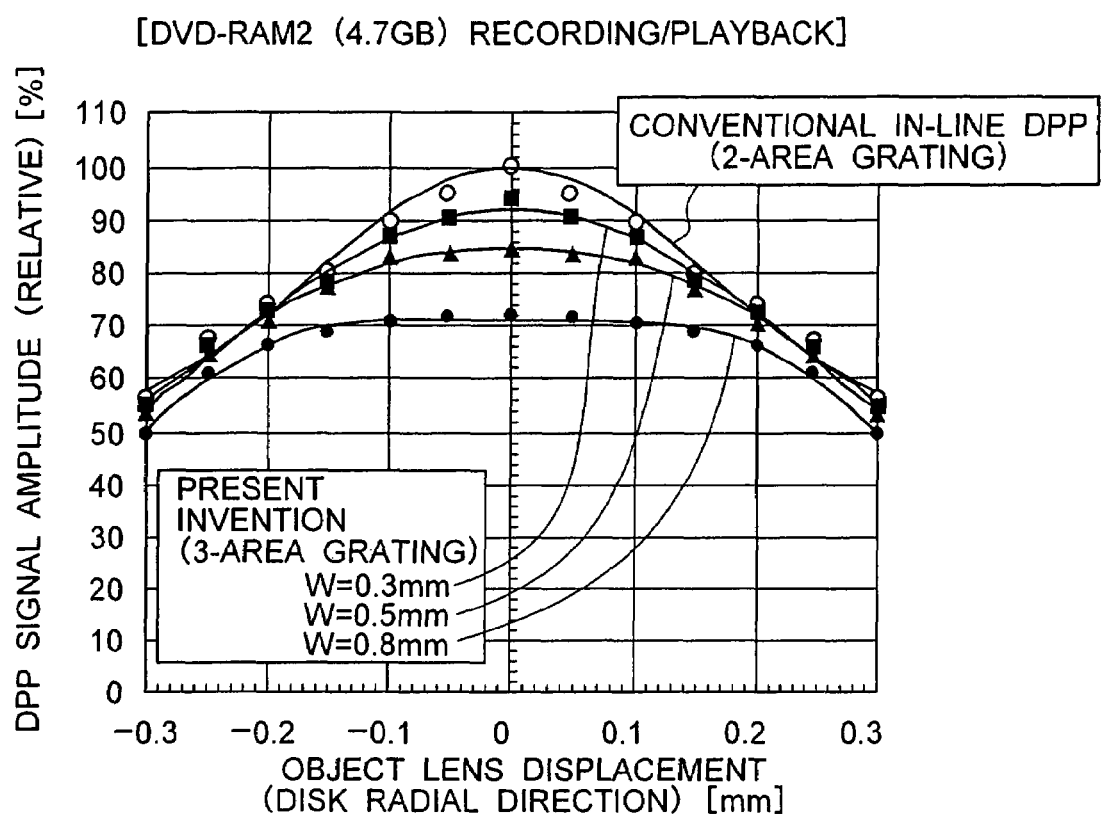
FIG. 15 is a graph showing the "object lens displacement-to-tracking error signal ratio characteristic" when a DVD-RAM2 disk is played back by optical pickups according to the present invention and the conventional in-line DPP method.

Next, FIG. 15 is a graph showing the "object lens displacement-to-tracking error signal ratio characteristic" of the DPP signal amplitude detected by the in-line DPP method, which has been obtained by computer simulation for a case where a DVD-RAM2 disk (storage capacity: 4.7 GB, guide groove interval: 1.23 μm) is played back by an optical pickup having the same parameters as those in FIG. 14. In FIG. 15, the horizontal and vertical axes and parameters are exactly the same as those of FIG. 14. As is clear from FIG. 15, the in-line DPP method according to the present invention, with the 3-area diffraction grating, satisfactorily improves the "object lens displacement-to-tracking error signal ratio characteristic" also in the playback of DVD-RAM2, in contrast with the conventional in-line DPP method.

As seen in FIGS. 14 and 15, in the in-line DPP method of the present invention employing the 3-area diffraction grating, both in DVD-RAM1 playback and DVD-RAM2 playback, the deterioration rate of the DPP signal amplitude with respect to the object lens displacement is more reduced as the width of the central area 32 of the 3-area diffraction grating 2 gets larger i.e. as W gets larger in FIGS. 14 and 15. However, a detailed examination revealed that increasing the central area width W of the 3-area diffraction grating 2 too much results in severer distortion in the DPP signal waveform. By extensive numerical calculations and examinations, a suitable range of the central area width W, converted into the width of the corresponding central area of the wavefront of the beam just before entering the object lens 5, was found to be 10% to 40% (preferably, 20% to 30%) of the aperture of the object lens 5.

While results for the playback of DVD-R/RW are not particularly shown, an excellent "object lens displacement-to-tracking error signal ratio characteristic" as in the conventional DPP method can be obtained by the in-line DPP method of the present invention employing the 3-area diffraction grating.

Incidentally, the above computer simulation of FIGS. 14 and 15 was performed assuming, for simplifying calculations, that the sum of light quantities detected at the two sub beam spots, convergence spots formed on the optical disk by the ±1st order diffracted beams diffracted and separated by the diffraction grating 2, is equal to a light quantity detected at the main beam spot, convergence spot formed on the optical disk by the 0th order beam transmitted by the diffraction grating 2 intact, and the DPP signal was calculated as:

DPP signal=[push-pull signal obtained from main beam spot]−[sum of push-pull signals obtained from two sub beam spots]

However, in actual optical pickups, there obviously occurs a difference of light quantity between the main beam spot and the sub beam spots due to a difference of diffraction efficiency of the diffraction grating 2 between the 0th order beam and the ±1st order diffracted beams, etc. As a result, a great difference of amplitude arises in the push-pull signals obtained from the convergence spots. For this reason, when the DPP signal is obtained from an actual optical pickup, a proper amplification factor K is generally introduced to the push-pull signals obtained from the sub beam spots and the DPP signal is calculated as:

DPP signal=[push-pull signal obtained from main beam spot]−K×[sum of push-pull signals obtained from two sub beam spots]

The amplification factor K can be analyzed into:

$K=K1 \times K2$ where K1 can be expressed as:

K1=[light quantity detected at main beam spot]/[sum of light quantities detected at two sub beam spots]

Meanwhile, K2 is a compensation coefficient for compensating for the difference between the modulation degree of the push-pull signal obtained from the main beam spot and the modulation degree of the push-pull signal obtained from the sub beam spots.

In the conventional DPP method and the conventional in-line DPP method employing the 2-area diffraction grating, the modulation degree of the push-pull signal obtained from the sub beam spots has generally been equated with the modulation degree of the push-pull signal obtained from the main beam spot, that is, the compensation coefficient K2 has been neglected or set to K2=1, K=K1.

However, in the in-line DPP method of the present invention employing the 3-area diffraction grating 2, there occurs an obvious difference between the modulation degree of the push-pull signal obtained from the main beam spot and the modulation degree of the push-pull signal obtained from the sub beam spots (generally, the former is larger than the latter). Thus, it is desirable that K2 be set to a proper value larger than 1. Further, we found out that the optimum value of K2 changes depending on the track pitch (guide groove pitch) of the disk.

Figure 16:
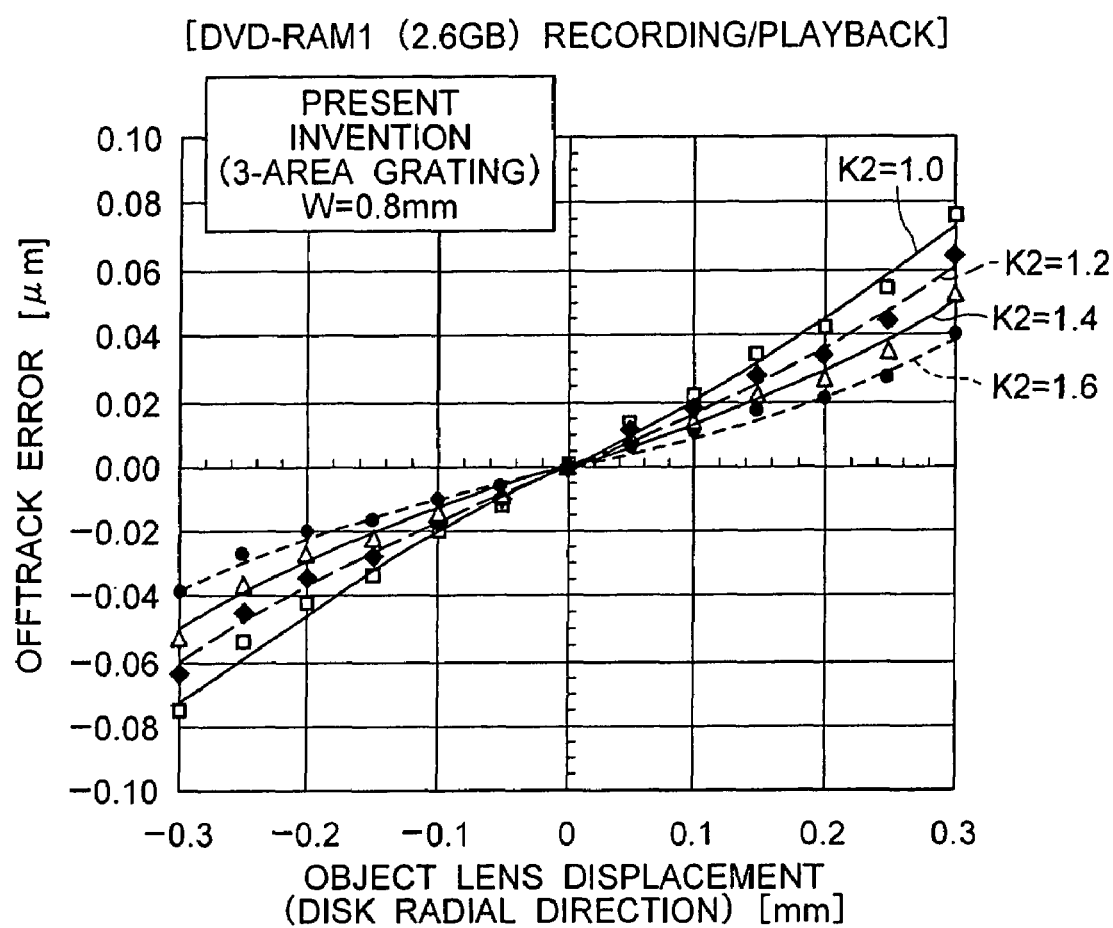
FIG. 16 is a graph showing the relationship between the object lens displacement and residual offtrack error after the servo pull-in when a DVD-RAM1 disk is played back by the present invention.

FIG. 16 is a graph showing the relationship between the object lens displacement and residual offtrack error of the DPP signal, deviation of the tracking servo pull-in point or zero-cross point of the DPP signal detected by the optical pickup from the true center of the guide groove, in the playback of a DVD-RAM1 disk, calculated for several values of K2. The optical pickup parameters used for the calculation are the same as those in the computer simulation of FIGS. 14 and 15.

As shown in FIG. 16, while the residual offtrack error develops considerably as the object lens displacement increases in the conventional setting K2=1.0, the residual offtrack error decreases proportionally to the increasing K2. However, detailed calculations made it clear that too large K2 causes severer distortion in the DPP signal waveform, similarly to the case where the central area width W of the 3-area diffraction grating 2 is increased too much. From our examinations, the optimum value of K2 for the playback of DVD-RAM1 disks is approximately 1.4 to 1.6.

Figure 17:
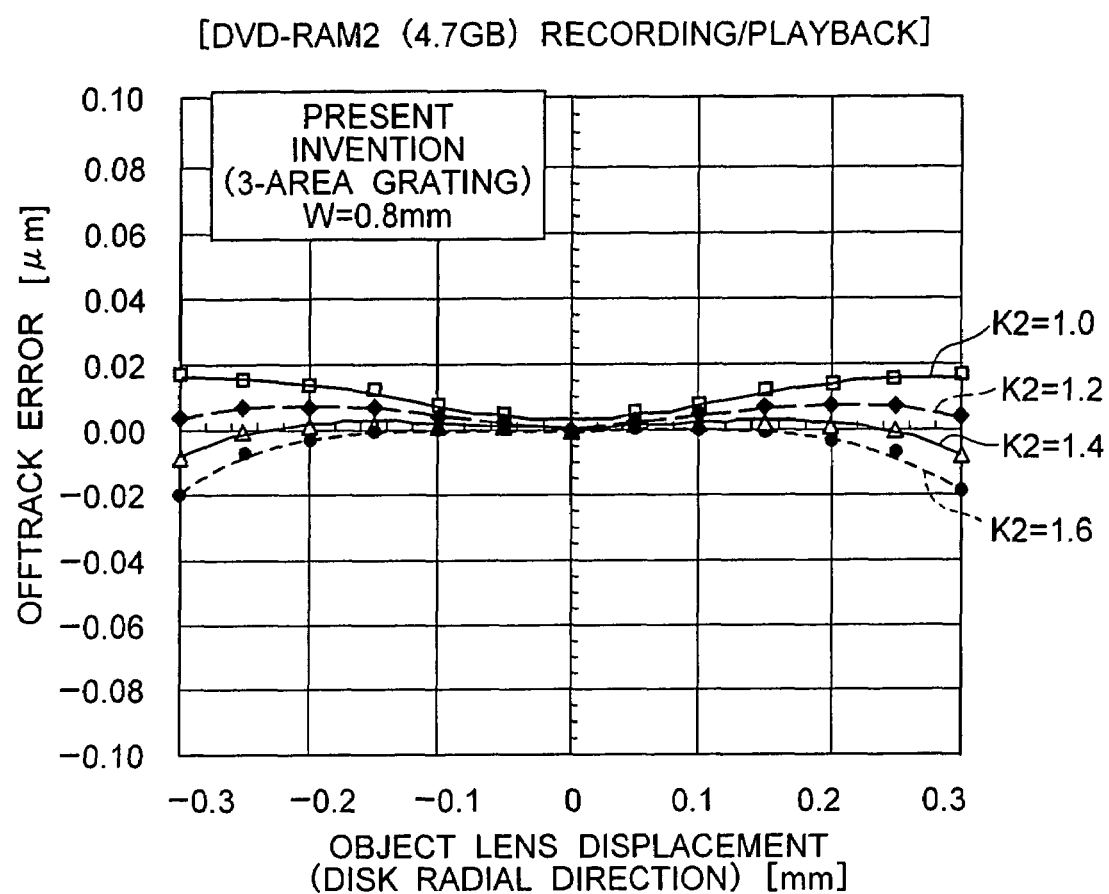
FIG. 17 is a graph showing the relationship between the object lens displacement and residual offtrack error after the servo pull-in when a DVD-RAM2 disk is played back by the present invention.

FIG. 17 is a graph similarly showing the relationship between the object lens displacement and the residual offtrack error of the DPP signal calculated for several values of K2, in the playback of a DVD-RAM2 disk. Also in the playback of DVD-RAM2, the residual offtrack error accompanying the object lens displacement varies according to the change in K2. However, in the case of DVD-RAM2, the optimum value of K2 is approximately 1.2 to 1.4, and by setting K2 within the range, the residual offtrack error can be almost perfectly eliminated in the object lens displacement range between −0.3 mm and +0.3 mm.

While results for the playback of DVD-R/RW (guide groove interval: 0.74 µm) are not particularly shown, the conventional setting K2=1.0 as optimum value eliminates the residual offtrack error almost perfectly in the object lens displacement range between −0.3 mm and +0.3 mm.

Figure 4:
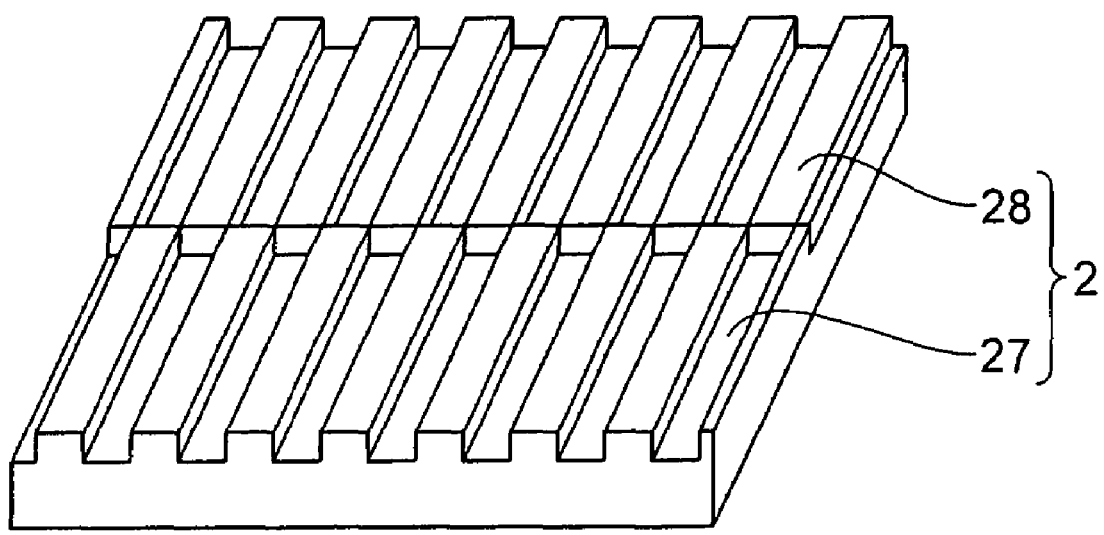
FIG. 4 is a perspective view showing an example of a diffraction grating employed in the conventional in-line DPP method.

Incidentally, also in the conventional in-line DPP method shown in FIG. 4 employing the 2-area diffraction grating, it is possible to reduce the residual offtrack error satisfactorily by varying the optimum value of K2 depending on the type of the disk.

Figure 18A:
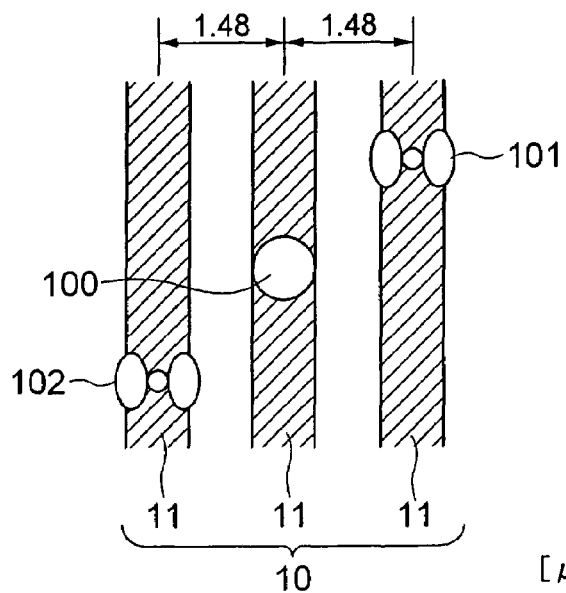
FIGS. 18A and 18B are layout plans showing another embodiment of the present invention concerning the arrangement of convergence spots.
Figure 18B:
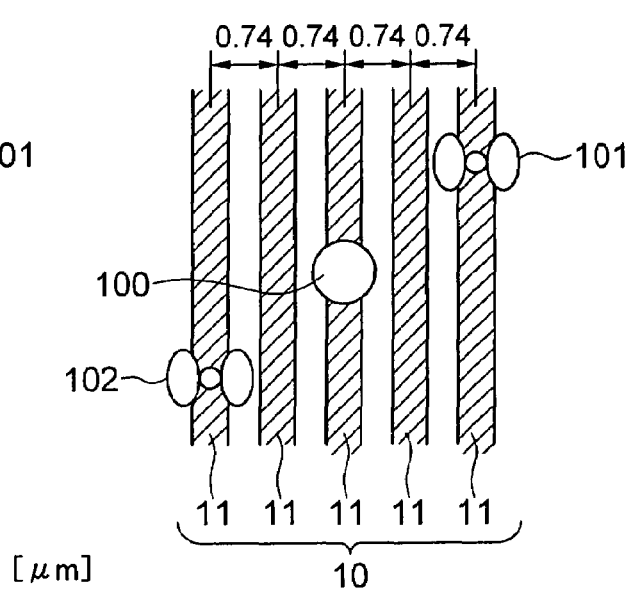

The above is the outline of the principle of the present invention. In the following, another embodiment according to the present invention will be described. While the main beam spot and the two sub beam spots were simultaneously formed in the same guide groove of the optical disk in the above embodiment shown in FIGS. 1 and 7, the beam spot arrangement is not limited to the in-line arrangement shown in FIG. 7. The DPP signal can be obtained by exactly the same unit as that in the in-line DPP method of the present invention as long as the distance between the main beam spot and the sub beam spot measured in the disk radial direction is set to an integral multiple of the track pitch of the disk. For example, assuming that the distance between the main beam spot 100 and each sub beam spot 101, 102 in the disk radial direction is set approximately equal to one guide groove pitch 1.48 µm of DVD-RAM1 as shown in FIG. 18A for the playback of a DVD-RAM1 disk, if a DVD-R/RW disk is played back with the same beam spot arrangement, the main beam spot 100 and sub beam spots 101 and 102 are simultaneously formed precisely at the centers of separate guide grooves as shown in FIG. 18B, by which the tracking error signal detection by the in-line DPP method also becomes possible. Incidentally, when a DVD-RAM2 disk of the guide groove pitch: 1.23 µm is played back with the same beam spot arrangement placing the main beam spot at the center of a guide groove, each sub beam spot slightly deviates from the center of an adjacent guide groove. However, the deviation is almost negligible and no major problem arises in the detection of the tracking error signal by the in-line DPP method. Further, as a matter of course, the distance between the main beam spot 100 and each sub beam spot 101, 102 in the disk radial direction is not limited to the above value. For example, the distance may also be set to approximately 1.36 µm, which is in between 1.48 µm of the guide groove pitch of DVD-RAM1 and 1.23 µm of the guide groove pitch of DVD-RAM2.

Figure 19:
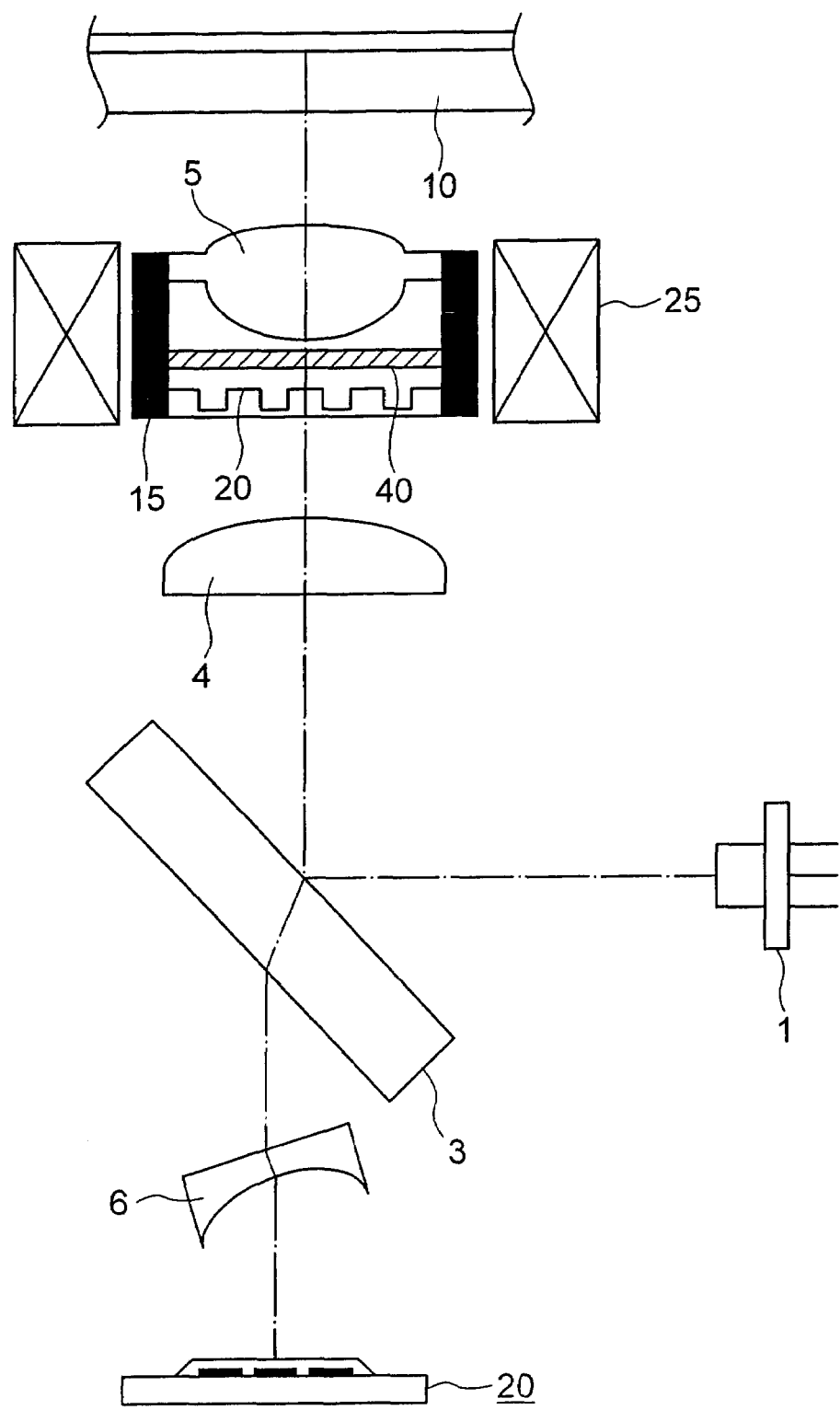
FIG. 19 is a schematic block diagram showing an optical pickup in accordance with another embodiment of the present invention.

In the following, still another embodiment according to the present invention will be described referring to FIG. 19. FIG. 19 is a schematic block diagram showing another example of an optical pickup in accordance with the present invention, in which the same reference numerals as those of FIG. 1 in the first embodiment designate the same components as those of FIG. 1.

While the diffraction grating 2 of the present invention was placed between the semiconductor laser light source 1 and the half mirror 3 in the first embodiment shown in FIG. 1, the position of the diffraction grating 2 is not particularly limited as long as it is on the optical path between the light source and the object lens. In the example of FIG. 19, the diffraction grating 2 is placed right in front of the object lens S and fixed in the lens holder 15 together with the object lens 5, allowing the object lens 5 to be driven by the two-dimensional actuator 25 together with the object lens 5. By such composition of the optical pickup, the aforementioned deterioration of the "object lens displacement-to-tracking error signal ratio characteristic" accompanying the object lens displacement can be reduced further since the positional relationship between the object lens 5 and the diffraction grating 2 does not change even if the object lens displacement occurred.

Incidentally, in the above composition of FIG. 19 with the diffraction grating 2 placed right in front of the object lens 5, not only going beams, the disk-incident beams traveling from the semiconductor laser light source 1 to the optical disk 10, but also returning beams, the disk-reflected beams traveling from the optical disk 10 to the photodetector 20, pass through the diffraction grating 2. Therefore, if a diffraction grating having ordinary diffraction characteristics is used, the returning beams are further diffracted by the diffraction grating 2, causing unnecessary stray light and deteriorating performance of the pickup. The problem can be resolved by employing a diffraction grating 2 having anisotropic diffraction characteristics, for example, a diffraction grating diffracting a beam having a particular polarization direction with certain diffraction efficiency while perfectly transmitting a beam having a polarization direction orthogonal to the particular polarization direction without generating diffracted light, and placing a quarter wave plate 40 on the optical path between the diffraction grating 2 and the object lens 5 for orthogonalizing the polarization directions of the going and returning beams.

In addition, while the optical elements of the optical pickup were arranged separately in the above embodiments, the present invention is not limited to such optical pickups. In an example shown in FIG. 20 (in which the same reference numerals as those of FIGS. 1 and 19 are used for optical elements equivalent to those of the previous embodiments), the so-called "semiconductor laser module" is employed, in which the semiconductor laser light source 1, photodetector 20, etc. are assembled into one package 41.

Figure 20:
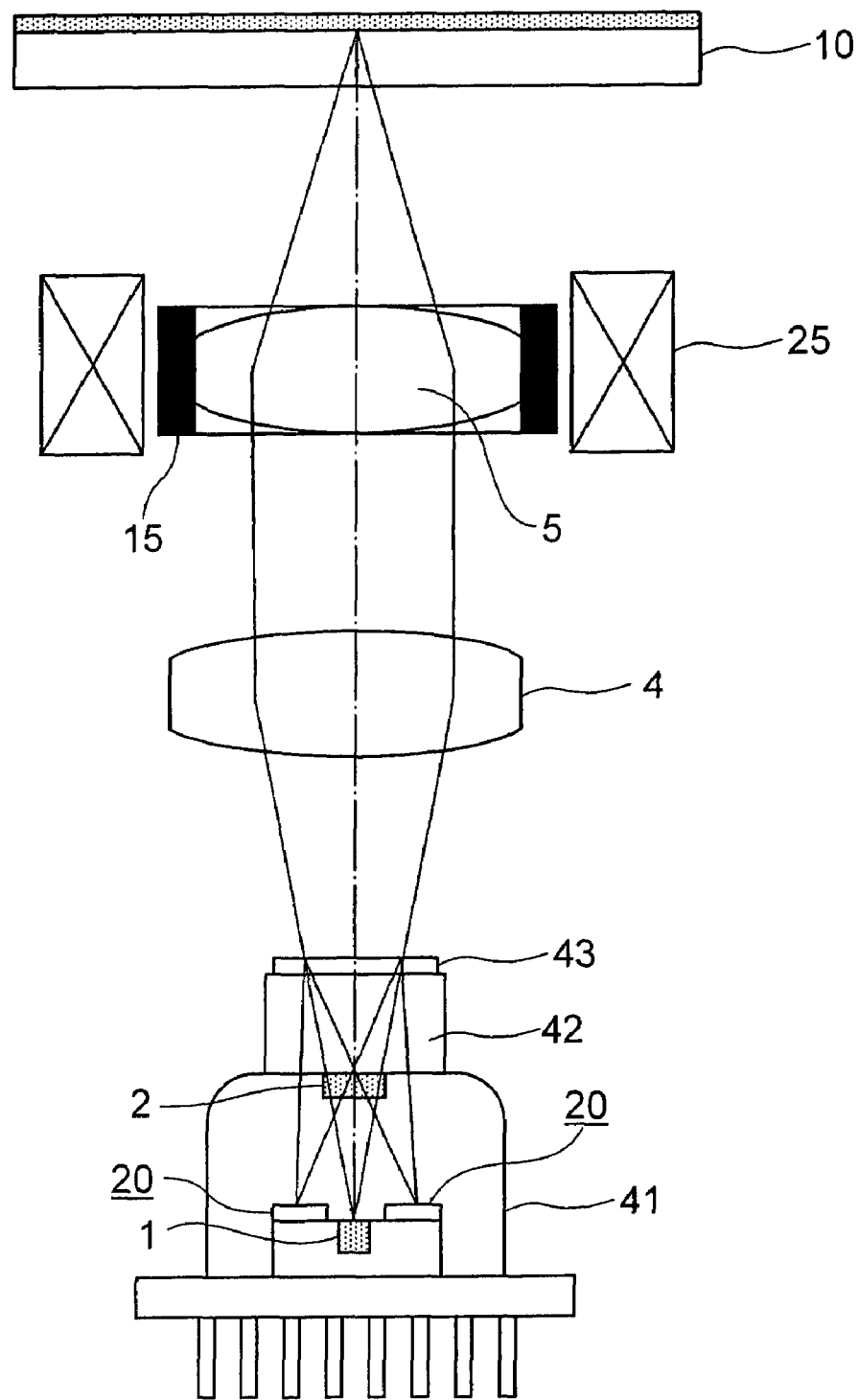
FIG. 20 is a schematic block diagram showing an optical pickup in accordance with another embodiment of the present invention.

In the example of FIG. 20, the package 41 is sealed up by putting a transparent substrate 42 with a proper thickness at the opening of the package 41 where the laser beam emitted by the light source 1 emerges. On the upper surface of the transparent substrate 42 is a hologram element 43, having the functions of separating the optical paths of the going beams traveling from the light source 1 to the optical disk 10 and the returning beams traveling from the optical disk 10 to the photodetector 20 and leading the returning beams to the photodetector 20. The diffraction grating 2 of the present invention is placed at the lower surface of the transparent substrate 42.

The optical pickup employing the above semiconductor laser module, in which the semiconductor laser light source 1, the photodetector 20, etc. are assembled into one package 41, has the advantage of reducing the size and thickness of the optical pickup.

Incidentally, while concrete shapes and arrangement of the photoreceptor surfaces of the photodetector 20 are not particularly shown in FIG. 20, the semiconductor laser module can of course have a variety of composition as long as it can detect the tracking error signal by the differential push-pull method.

It goes without saying that the application of the present invention is not restricted to the optical pickups which have been shown in FIGS. 1, 19 and 20. The present invention is applicable to various optical pickups of a wide range of composition as long as they employ tracking error signal detection units according to the differential push-pull method.

Figure 21:
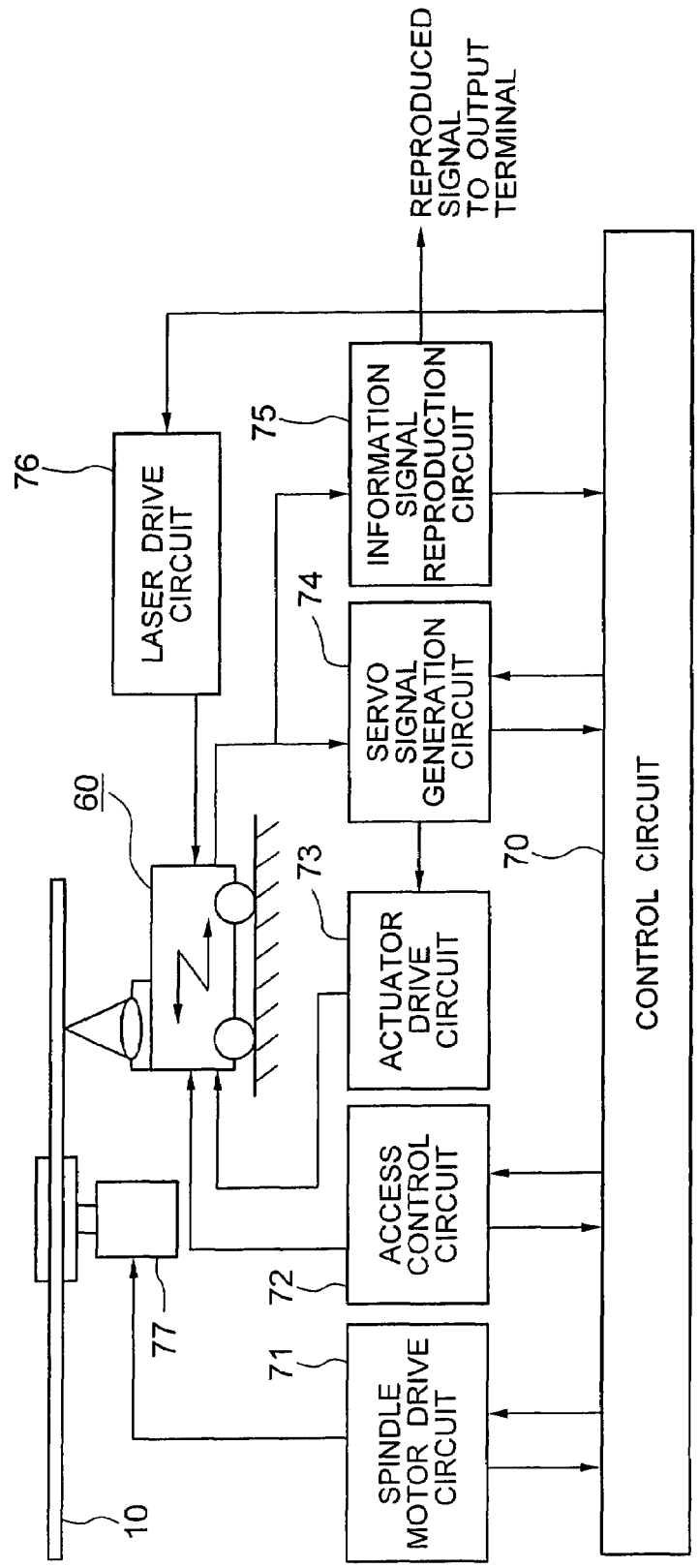
FIG. 21 is a block diagram showing an example of an optical information recording/reproducing apparatus employing the optical pickup according to the present invention.

Lastly, an embodiment of an optical information recording/reproducing apparatus employing the optical pickup of the present invention is shown in FIG. 21. The optical information recording/reproducing apparatus of FIG. 21 can also be implemented as a separate recording apparatus or a separate reproducing apparatus.

In FIG. 21, the reference numeral 60 denotes an optical pickup having the composition of FIG. 1, 19 or 20, for example. The optical pickup 60 is provided with a mechanism for sliding in the radial direction of the optical disk 10, and the position of the optical pickup 60 is controlled by an access control signal supplied from an access control circuit 72.

A semiconductor laser light source in the optical pickup 60 is supplied with a drive current from a laser drive circuit 76 and thereby emits a laser beam with a proper light quantity. Various servo signals and information signals detected by photodetectors of the optical pickup 60 are sent to a servo signal generation circuit 74 and an information signal reproduction circuit 75. The servo signal generation circuit 74 generates the focus error signal and the tracking error signal from the detected signals. An actuator drive circuit 73 drives a two-dimensional actuator in the optical pickup 60 based on the focus error signal and the tracking error signal, by which position control of the object lens 5 is carried out. The information signal reproduction circuit 75 reproduces the information signal which has been recorded in the optical disk 10, by use of detected signals.

Part of the signals obtained by the servo signal generation circuit 74 and the information signal reproduction circuit 75 are supplied to a control circuit 70. The control circuit 70 is connected to the laser drive circuit 76, the access control circuit 72, a spindle motor drive circuit 71, etc., by which, the control of emission light quantity of the semiconductor laser of the optical pickup 60, the control of access direction/position, the control of a spindle motor 77 for revolving the optical disk 10, etc. are realized. The control circuit 70 includes a disk discrimination circuit (unshown), which recognizes the type of the optical disk using signals obtained by the servo signal generation circuit 74 and the information signal reproduction circuit 75. Based on the disk type recognition, a gain (corresponding to K2) for sub push-pull signals (push-pull signals obtained from the sub beam spots) to be adopted by a DPP signal generation circuit (unshown) of the servo signal generation circuit 74 is controlled automatically, for example.

As set forth hereinabove, by the present invention, an excellent and practical tracking error signal, in which the amplitude deterioration of tracking error signal and the residual offtrack error accompanying the displacement of the object lens have been reduced satisfactorily, can be obtained in the recording/playback of various types of optical disks having different track pitches. Therefore, an optical pickup with high versatility and high reliability and an optical information recording/reproducing apparatus employing such an optical pickup can be realized.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical information recording/reproducing apparatus comprising:
    an optical pickup; and
    a tracking error signal generation unit which generates a tracking error signal according to a differential push-pull method by executing predetermined operation to signals obtained from the optical pickup;
    wherein said optical pickup includes:
    a laser light source which emits a laser light beam;
    a diffraction grating which diffracts the laser light beam emitted by the laser light source into at least three laser light beams;
    a beam splitter which transmits the at least three laser light beams; and
    a detector which detects a reflected light beam from an optical disk, wherein:
    the diffraction grating includes first, second and third areas, the first area is placed between the second and third areas and the second area has a periodic structure that is shifted from that of the third area by 180° in the phase of the periodic structure,
    the second and third areas have periodic structures that are phase shifted from that of the first area, the detector includes first, second and third photoreceptor surfaces, and signals from the first, second and third photoreceptor surfaces are combined by addition and/or subtraction.

2. The optical information recording/reproducing apparatus according to claim 1, wherein the width of said first area is narrower than the width of said second area and said third area.

3. The optical information recording/reproducing apparatus according to claim 1, further comprising an objective lens which converges the at least three laser light beams diffracted by said diffraction grating on the optical disk, wherein a range of the width of said first area is found to be 10% to 40% of the aperture of the object lens.

4. The optical information recording/reproducing apparatus according to claim 1, wherein the signals associated with the second and third photoreceptor surfaces are added together and the result thereof is subtracted from the signal associated with the first photoreceptor surface.

5. The optical information recording/reproducing apparatus according to claim 1, wherein the periodic structure of the second or third area is phase shifted by approximately 90° from the periodic structure of the first area.

6. An optical information recording/reproducing apparatus comprising:

an optical pickup; and a tracking error signal generation unit which generates a tracking error signal according to a differential push-pull method by executing predetermined operation to signals obtained from the optical pickup;

wherein said optical pickup includes:

a laser light source which emits a laser light beam;

a diffraction grating which diffracts the laser light beam emitted by the laser light source into at least three laser light beams;

a beam splitter which transmits the at least three laser light beams; and a detector which detects a reflected light beam from an optical disk, wherein:

the diffraction grating includes first, second and third areas, the first area is placed between the second and third areas and the second area has a periodic structure that is shifted from that of the third area by 180° in the phase of the periodic structure, the detector includes first, second and third photoreceptor surfaces, signals from the first, second and third photoreceptor surfaces are combined by addition and/or subtraction, and the width of said first area is narrower than the width of said second area and said third area.

7. The optical information recording/reproducing apparatus according to claim 6, further comprising an objective lens which converges the at least three laser light beams diffracted by said diffraction grating on the optical disk, wherein a range of the width of said first area is found to be 10% to 40% of the aperture of the object lens.

8. The optical information recording/reproducing apparatus according to claim 6, wherein the signals associated with the second and third photoreceptor surfaces are added together and the result thereof is subtracted from the signal associated with the first photoreceptor surface.

9. The optical information recording/reproducing apparatus according to claim 6, wherein the periodic structure of the second or third area is phase shifted by approximately 90° from the periodic structure of the first area.

* * * * *